United States Patent
Ban et al.

(10) Patent No.: US 9,317,819 B2
(45) Date of Patent: Apr. 19, 2016

(54) METHOD AND SYSTEM FOR USING A COMPONENT BUSINESS MODEL TO TRANSFORM WARRANTY CLAIMS PROCESSING IN THE AUTOMOTIVE INDUSTRY

(75) Inventors: Linda Barbara Ban, Southfield, MI (US); Penny Olson Koppinger, Bloomfield Hills, MI (US); Benjamin Thomas Stanley, Davison, MI (US)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 12/061,383

(22) Filed: Apr. 2, 2008

(65) Prior Publication Data

US 2008/0215400 A1 Sep. 4, 2008

(51) Int. Cl.
*G06F 9/44* (2006.01)
*G06Q 10/06* (2012.01)
*G06Q 30/02* (2012.01)

(52) U.S. Cl.
CPC .......... *G06Q 10/06* (2013.01); *G06Q 10/06312* (2013.01); *G06Q 10/06315* (2013.01); *G06Q 10/06393* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 2002/0052862 A1 | 5/2002 | Scott et al. | |
| 2002/0128874 A1* | 9/2002 | McIntosh et al. | 705/4 |
| 2003/0004746 A1* | 1/2003 | Kheirolomoom et al. | 705/1 |
| 2005/0005261 A1 | 1/2005 | Severin | |
| 2005/0246215 A1* | 11/2005 | Rackham | 705/7 |
| 2006/0241956 A1* | 10/2006 | Levy et al. | 705/1 |

OTHER PUBLICATIONS

A. Sureka, et al., "A Generic Software Architecture of a Text Processing System for Analyzing Product Warranty Claims Data", 2008, ACM, pp. 1-4.
M. R., Lyu., "Software Reliability Engineering: A Roadmap.", Future of Software Engineering (FOSE'07) 2007. 17pages.

* cited by examiner

*Primary Examiner* — Qamrun Nahar
(74) *Attorney, Agent, or Firm* — Whitham Curtis Christofferson & Cook, PC; David Quinn

(57) ABSTRACT

A method, system and service for using a component business model to transform a business process. The invention uses a component business model of a business to prioritize business changes affecting key performance indicators for the business process, defines an information technology architecture to support the business changes, and specifies a roadmap for implementing the supporting information technology architecture. In a particular application of the invention to the automobile manufacturing business, the business process is the warranty claims process, and a length of time to process a warranty claim is a key performance indicator.

17 Claims, 25 Drawing Sheets

| Component | | Activity Level 1 | | Strategic/ Non-core | Financial (SG&A) Impact | Transformational Priority | Solution Impact |
|---|---|---|---|---|---|---|---|
| 610 | | 620 | | 630 | 640 | 650 | 660 |
| Warranty Management | | Communicate Warranty - Transaction | 621 | Basic | Limited | Medium Priority | No Impact |
| | | Communicate Warranty - Notification/Recall | 622 | Basic | Limited | Medium Priority | Partial Impact |
| | | Monitor, track warranty and repairs | 623 | Basic | High Cost | Immediate Priority | Direct Impact |
| | | Manage Claims | 624 | Basic | High Cost | Immediate Priority | Direct Impact |
| Quality Management | | Identify quality issues | 625 | Competitive Parity | High Cost | Immediate Priority | Direct Impact |
| | | Monitor/Diagnose parts | 626 | Competitive Parity | High Capital + High Cost | Immediate Priority | Partial Impact |
| | | Analyze Early Warning data | 627 | Competitive Parity | High Cost | Immediate Priority | Direct Impact |
| | | Provide Feedback to enterprise | 628 | Competitive Parity | Limited | Immediate Priority | Direct Impact |
| | | Regulatory Compliance | 629 | Basic | Limited | Immediate Priority | No Impact |

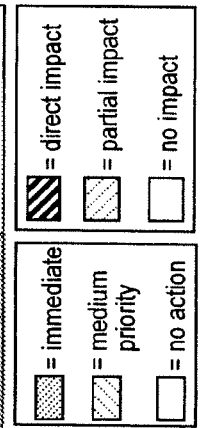

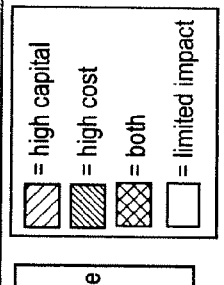

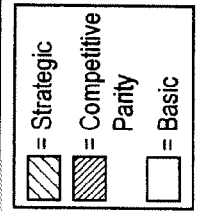

*Figure 6*

Roadmap

| | Short Term | Mid Term | Long Term |
|---|---|---|---|
| Solution | Through integration of disparate data, significantly reduce processing and transaction cycle time throughout the enterprise necessary to speed claim resolution | Expanded inter-enterprise collaborative capabilities with through increased warranty data sharing (e.g. detailed claim data, component interface, and part interoperability) | Full Integration of business rules between OEM/Supplier/Dealer to orchestrate business events in an On-Demand environment |
| Technology Evolution | • Collaborative applications to integrate data repository (avoid duplication of data)<br>• Normalization of data for data interpretation | • Leverage portal capabilities for OEM/Supplier data sharing<br>• Establish workflow engine with event triggers<br>• Optimization of use of text mining tools | • Service oriented integration of infrastructure, data mgt, and analytical capabilities<br>• Grid/utility service for variable infrastructure model<br>• Autonomic technology to support analytical capabilities |
| Benefits | • Compressed time to process claims resulting in fewer incidents for a given problem | • Contained warranty reserves as a % of revenues<br>• Improved accuracy of claim data to facility cost recovery with suppliers<br>• Reduced parts inventory associated with fewer claims | • Improved quality management through module/system integration vs. component performance<br>• Warranty performance integrated to supplier overall performance<br>• Improved customer satisfaction and brand impact<br>• Variable investment in warranty application management solutions |

*Figure 12*

METHOD AND SYSTEM FOR USING A COMPONENT BUSINESS MODEL TO TRANSFORM WARRANTY CLAIMS PROCESSING IN THE AUTOMOTIVE INDUSTRY

This invention claims priority from parent U.S. patent application Ser. No. 11/490,524 entitled "METHOD AND SYSTEM FOR USING A COMPONENT BUSINESS MODEL TO TRANSFORM WARRANTY CLAIMS PROCESSING IN THE AUTOMOTIVE INDUSTRY" filed on Jul. 21, 2006 and priority from U.S. Provisional Patent Application Ser. No. 60/701,632 entitled "Automotive Warranty Component Business Model (CBM)" filed on Jul. 22, 2005 and is related to commonly owned patent application Ser. No. 11/176,371 for "SYSTEM AND METHOD FOR ALIGNMENT OF AN ENTERPRISE TO A COMPONENT BUSINESS MODEL" filed on Jul. 8, 2005, all of which are incorporated by reference herein.

BACKGROUND OF THE INVENTION

1. Field of the Invention

The present invention generally relates to component based business models and, more particularly, to using a component business model as a basis for developing a service, system and method for an improved automotive warranty claims process.

2. Background Description

Across the automotive industry escalating warranty costs are consuming significant revenue from manufacturers and suppliers alike. In North America, the automotive industry spends nearly 3% of its revenue on warranty claims, totaling nearly $8 Billion in 2003. Further, warranty costs per vehicle are rising, in part because of an increasing percentage of in-vehicle software and electronics and greater complexity associated with increased reliance upon systems and modules rather than components.

Original equipment manufacturers (OEMs) in the automotive industry have developed point solutions to address certain issues. New call centers have been set up; systems to track claims have been implemented; new reports have been developed to identify problems and issues that have already surfaced. These solutions do not take into consideration the impact of warranty claims on all parts of the organization (including product design, development, build, sales and service). Warranty issues ultimately affect almost all major parts of the automotive business, and if not monitored, managed and addressed appropriately, result in significant impact to the bottom line.

A primary factor that influences overall warranty costs is the length of time from initial problem report to root cause identification to corrective action. Warranty claim resolution under the prior art typically takes more than 160 days. Because faster resolution results in fewer claims for a given problem and lower overall warranty costs, cycle time improvement represents a major financial opportunity for automotive companies.

Most automotive companies are painfully aware of these constraints but continue to struggle with warranty administration hurdles that constrain information sharing among OEMs and suppliers and delay problem diagnosis. Automotive companies are often unsure where to start their transformation effort, which organization is accountable and which warranty administration changes will have the most impact on their businesses.

What is needed is a methodology that enables an automotive company to take a strategic, enterprise-wide view of their organization to address warranty challenges.

SUMMARY OF THE INVENTION

An aspect of the invention is a method for using a component business model to transform a business process. The method uses a component business model of a business to prioritize business changes affecting key performance indicators for the business process, defines an information technology architecture to support the business changes, and specifies a roadmap for implementing the supporting information technology architecture.

In a further aspect of the method, the step of using a component business model of a business to prioritize business changes further comprises using a component business model to prioritize components of the business, identifying pain points in the business process, mapping the business process to the component business model, using the identified pain points and the mapped component business model to identify opportunities to improve the business process, the identified opportunities being opportunities to make business changes in the components, and prioritizing the identified opportunities in terms of impact on the key performance indicators and ease of implementation.

In yet another aspect of the method, the step of defining an information technology architecture to support the business changes further comprises defining a baseline solution architecture view, using the component business model to identify information technology shortfalls, mapping the pain points to the baseline solution architecture view, identifying business requirements for eliminating the pain points, identifying information technology capabilities required to support elimination of the pain points, and defining a target solution architecture view using the identified business requirements and the required supporting information technology capabilities.

In another aspect of the method, the step of using a component business model to prioritize components of the business further comprises developing a view of the component business model that indicates whether a given component is strategic, or is to be operated at competitive parity, or is to be operated at a basic level, and developing a view of the component business model that shows an impact of a given component on the key performance indicators.

It is also an aspect of the method for the components to be comprised of activities and for the identified opportunities to be opportunities to make business changes in the activities. In a further aspect of the method, the business process involves collaboration with dealers and suppliers. In another aspect of the method, the business is the automobile manufacturing business, the business process is the warranty claims process, and a length of time to process a warranty claim is a key performance indicator.

BRIEF DESCRIPTION OF THE DRAWINGS

The foregoing and other objects, aspects and advantages will be better understood from the following detailed description of a preferred embodiment of the invention with reference to the drawings, in which:

FIG. 6 is a chart showing a further level of analysis for two components with respect to the four views shown in FIGS. 5B through 5D.

FIG. 12 is a chart detailing the solution, technology evolution and benefits of the roadmap over the short term, mid-term and long term.

DETAILED DESCRIPTION OF A PREFERRED EMBODIMENT OF THE INVENTION

Figure 1A:
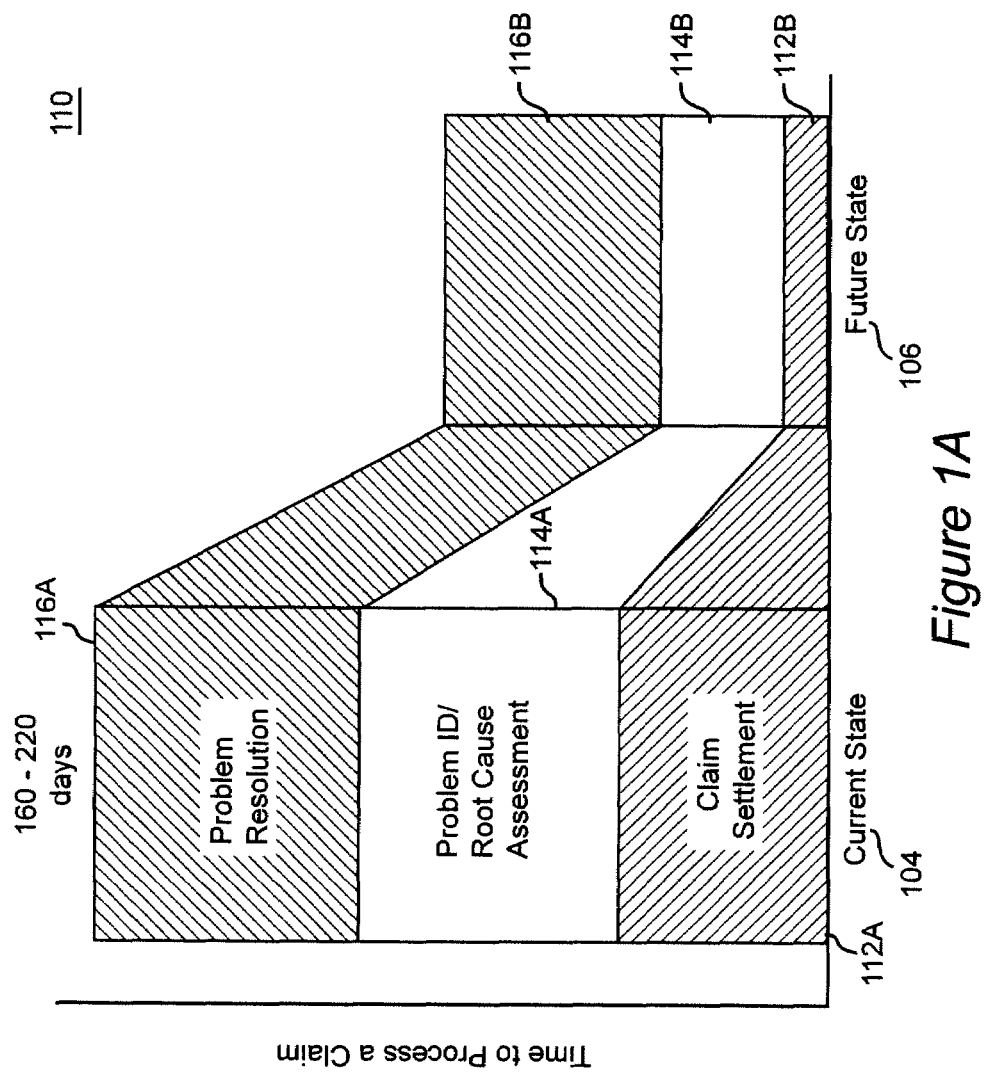
FIG. 1A is a conceptual graph showing the change in claim processing time between the current state and a target future state of warranty claim processing.

Component business modeling (CBM) takes a look at the business that is different from most conventional perspectives used for evaluating and improving the business, such as process analysis. Although process reengineering helps companies analyze and improve workflow, it focuses only on the workflow dimension of the business. CBM allows analysis from multiple perspectives, and the intersection of those views offers improved insights for decision making. Because CBM groups like activities together without regard to organizational, geographic or process boundaries, companies can use CBM analysis to more readily spot redundancy (similar business activities that are duplicated in other corners of the company, as well as redundant resources used to support those activities). CBM also helps clarify a company's focus on strategic, differentiating capabilities, enabling more straightforward prioritization of improvement plans.

It is an object of the present invention to provide a strategic, enterprise-wide view of the automotive organization to address warranty challenges.

A further object of the invention is to reduce the time from initial warranty problem report to corrective action.

The invention uses the Component Business Model (CBM) described in related patent application Ser. No. 11/176,371 for "SYSTEM AND METHOD FOR ALIGNMENT OF AN ENTERPRISE TO A COMPONENT BUSINESS MODEL" (hereafter termed "the above referenced foundation patent application"). CBM provides a logical and comprehensive view of the enterprise, in terms that cut across commercial enterprises in general and industries in particular. The component business model as described in the above referenced foundation patent application is based upon a logical partitioning of business activities into non-overlapping managing concepts, each managing concept being active at the three levels of management accountability: providing direction to the business, controlling how the business operates, and executing the operations of the business. The term "managing concept" is specially defined as described in the above referenced foundation patent application, and is not literally a "managing concept" as that phrase would be understood in the art. For the purpose of the present invention, as for the related invention, "managing concept" is the term associated with the following aspects of the partitioning methodology. First, the methodology is a partitioning methodology. The idea is to begin with a whole and partition the whole into necessarily non-overlapping parts. Second, experience has shown that the partitioning process works best when addressed to an asset of the business. The asset can be further described by attributes. Third, the managing concept must include mechanisms for doing something commercially useful with the asset. For a sensibly defined managing concept these mechanisms must cover the full range of management accountability levels (i.e. direct, control and execute). Managing concepts are further partitioned into components, which are cohesive groups of activities. The boundaries of a component usually fall within a single management accountability level. It is important to emphasize that the boundaries between managing concepts (and between components within managing concepts) are logical rather than physical.

As applied to the automotive industry, CBM analysis can be used to establish strategic, financial and transformational views of the business. The strategic view distinguishes which components offer opportunity for clear competitive differentiation, which are required for competitive parity, and which are basic necessities. The financial view highlights which components are associated with high capital investments, which carry high costs, and which have both. The transformational view assesses the overall level of business improvement opportunity present in each business component.

The example used to describe the present invention applies these CBM views and the tools provided by CBM analysis to reduce the time to process automobile warranty claims. Referring to the drawings, and more particularly to FIG. 1, there is shown two side by side bar charts 110 of the major categories of activities required to process warranty claims. As currently executed, there are claim settlement activities 112A, a group of activities 114A to identify the problem and assess the root cause of claims, and a group of problem resolution activities 116A. Together, from initiation of a claim to resolution of the underlying problem, the time to process a claim runs from 160 to 220 days under current practice.

By application of the invention, it is possible to reduce this processing time by 25 to 125 days, as shown by the "Future State" bar chart with corresponding claim processing activity categories 112B, 114B and 116B. Substantial reductions are obtained in the time required for claim settlement activities and problem identification activities, in particular, thereby shortening elapsed time to problem resolution. Consequently, by more quickly resolving underling problems and avoiding a significant percentage of claims that would otherwise require processing, warranty costs can be reduced.

Figure 1B:
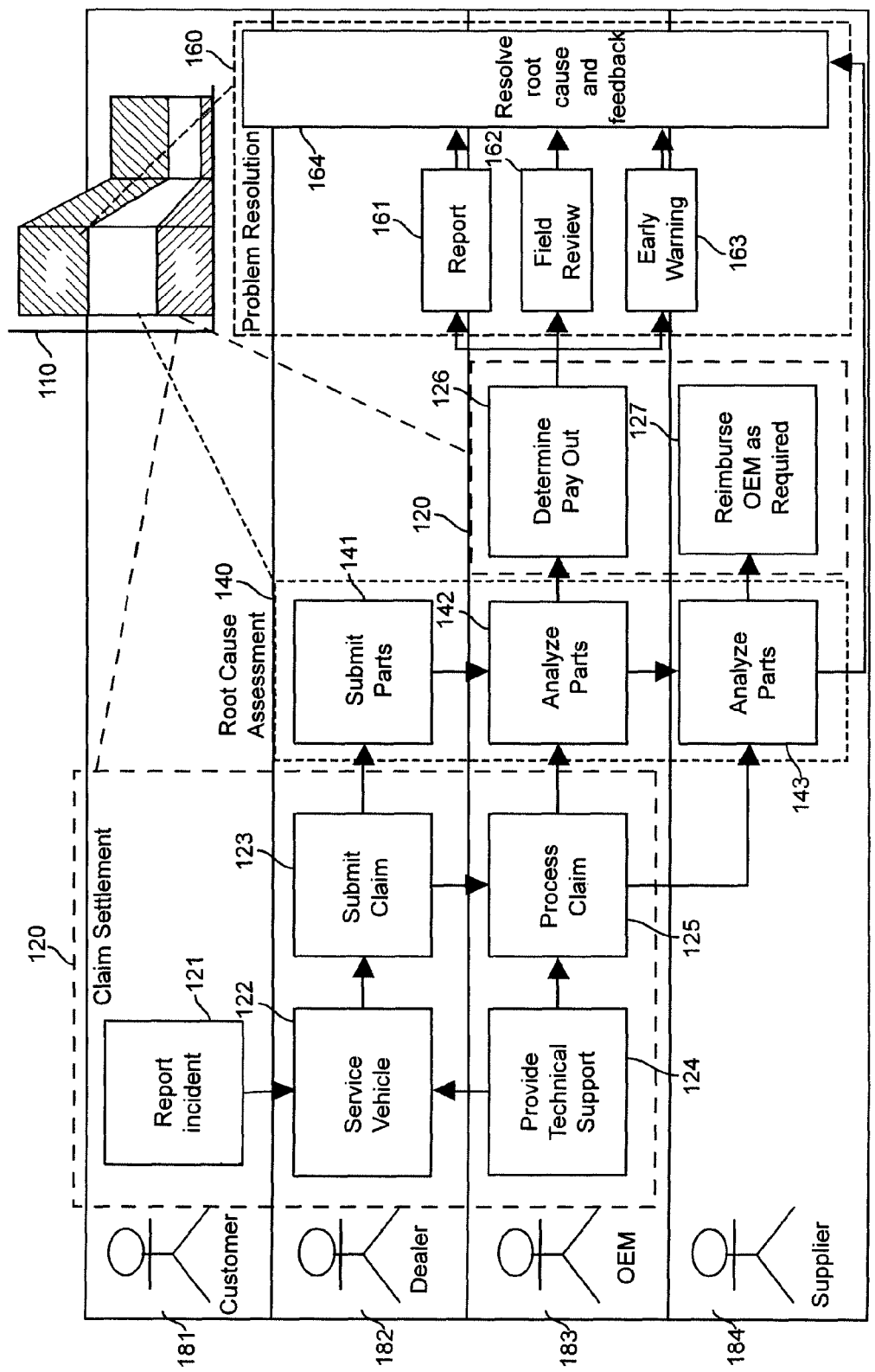
FIG. 1B provides a block diagram showing detail for the overall claims processing categories shown in FIG. 1A.

Time can be removed from the process by increasing collaboration and information sharing across the dealer, OEM and supplier participants in the process. FIG. 1B provides a more detailed description of the claims processing categories shown in the bar charts 110 of FIG. 1A. The customer 181 initiates an incident report 121 at the onset of the claims settlement process 120 by bringing the vehicle into the dealer 182 for repair. The dealer 182 services the customer's vehicle 122 and submits a formal claim 123. The automobile manufacturer (the OEM 183) provides technical support 124 to the dealer 182 and processes 125 the claim 123 submitted by the dealer. In order to assess the root cause 140 of failure during warranty, the dealer 182 submits the failed part 141 to the OEM 183 for analysis 142, and then to the supplier 184 for analysis 143. Claim settlement 120 is then completed after the OEM 183 determines a pay out 126 to the dealer for the warranty service and the supplier 184 reimburses the OEM 183 as required 127 by contractual relationships between the supplier 184 and the OEM 183. In order to resolve the problem 160, the OEM 183 produces a report 161 consolidating results of the analysis of the failed part, undertakes a field review 162, and develops early warning procedures 163 that may be followed by replacement of faulty parts or other steps to resolve the root cause 164.

Figure 2A:
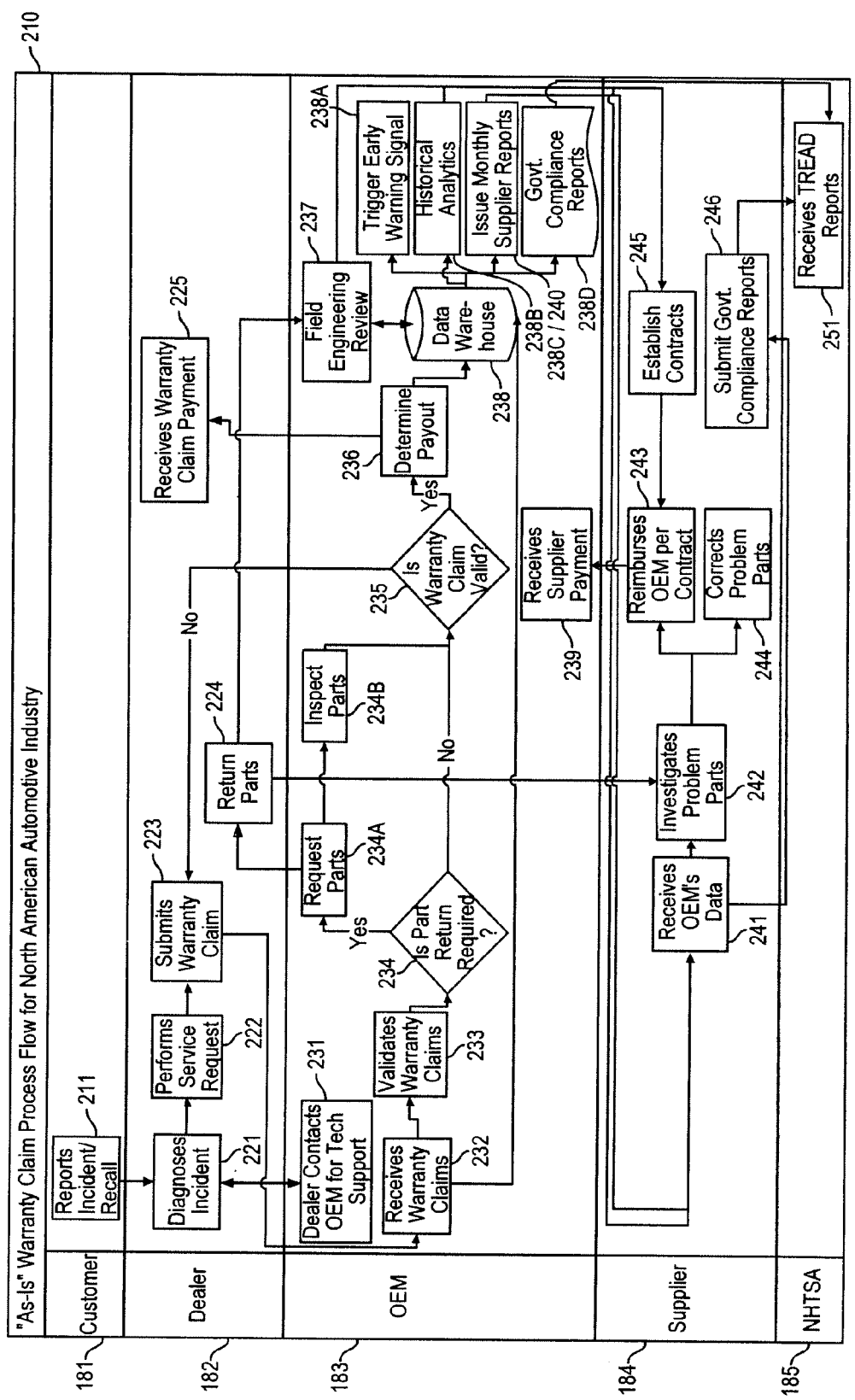
FIG. 2A is a flow chart showing the current claims administration process in the automotive industry.

A flow chart 210 for the warranty claim process is shown in greater detail in FIG. 2A. The customer 181 brings the vehicle in 211 for warranty service or pursuant to a recall. The dealer 182 diagnoses the incident 221, performs the service request 222 and submits a warranty claim 223. The OEM 183 responds 231 to any dealer requests for technical support, and receives 232 and validates 233 the warranty claim. If return of the warranted part is required 234, the OEM 183 requests the part 234A from the dealer 182, who returns the part 224 for inspection 234B by the OEM 183. The OEM 183 evaluates the warranty claim for validity 235, and if the claim is valid determines a payout 236 for the dealer 182, who receives payment 225. The OEM 182 performs a field engineering review 237 and provides the results of that review to the supplier 184. The OEM 183 stores data regarding the payout 236 and the field engineering review 237 in a data warehouse 238, and the data in the data warehouse 238 is used to trigger early warning signals 238A, provide historical analysis 238B, issue monthly reports 238C to suppliers, generate government compliance reports 238D, and provide the factual basis for establishing contract terms 245 with the supplier 184. The supplier 184 receives 241 the OEM field engineering review data, historical data and monthly reports, and in turn submits its own compliance reports 246 to the government. The supplier investigates problem parts 242, reimburses 243 the OEM 183 as required by the contract terms, and corrects problem parts 244. The National Highway Transportation Safety Administration (NHTSA) 185 receives 251 compliance reports submitted by the OEM 183 and the supplier 184.

Figure 2B:
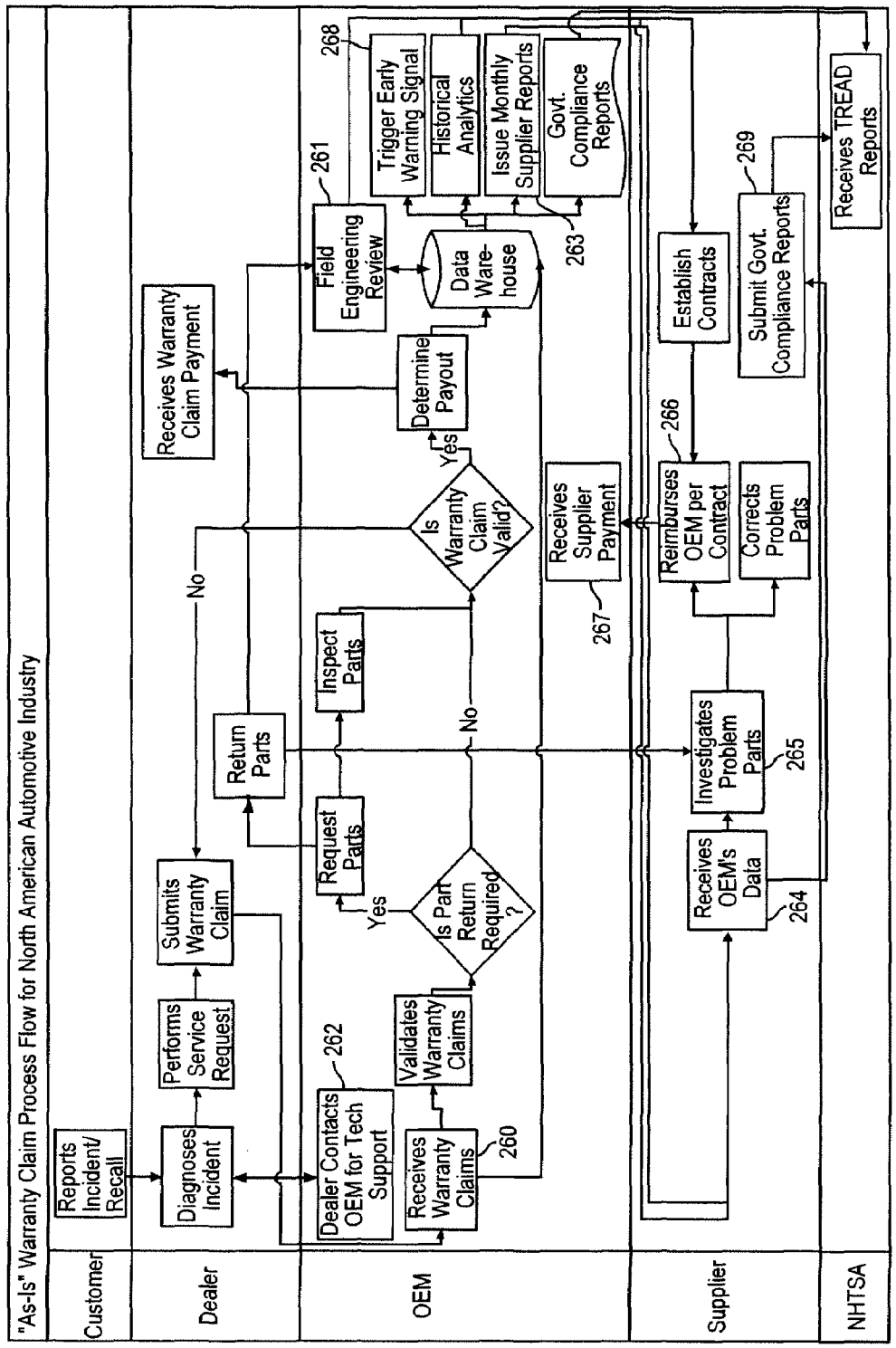
FIG. 2B highlights the pain points during execution of this process.

The flowchart shown in FIG. 2A details each step in the process from when a vehicle is brought in for repair, to if/when a regulatory agency is notified of an issue or problem. The flowchart includes each step in the process. However, each step may not be performed by every organization. For example, some manufacturers provide detail on warranty claims real time to their suppliers, others do not. Again, this example was put together based on knowledge of automotive processes and procedures, together with careful analysis and validation with subject matter experts. An output of this analysis was an identification of points in this process that were sources of pain and process delay for OEMs and suppliers, as shown in FIG. 2B. For the purposes of this application the term "pain points" will be used to describe these points, but in applications of the invention to other processes in other businesses "pain points" refers to sources of adverse affects upon identified key performance indicators for the process. In the example addressed in this application, the time to process warranty claims is a key performance indicator, and therefore "process delay" is a measure adverse to this key performance indicator.

As shown in FIG. 2B, incomplete data was captured from dealers 260 at the time warranty claims were received. Often, narrative information and vehicle configuration information was not included. Field engineering review was hampered 261 by lack of advanced tools and adequate information for the assessment of root causes. There was not sufficient data integration to promote timely and effective assessment of root causes. Consequently, technical support could not be provided to dealers 262 in a timely manner, and monthly reports to suppliers 263 provided little actionable information. The suppliers had limited access to OEM information 264, and where data was provided there was a lengthy cycle time between the incident and the receipt of data. There is a direct cost to the supplier to access multiple OEM warranty systems. Suppliers lack tools and data 265 to diagnose root causes, and there is a slow cycle time to respond to root causes. From the supplier's point of view, warranty debits from the OEM 266 are perceived as inaccurate, resulting in painful negotiations 267 to attribute accountability to suppliers. Further, few OEMs utilize early warning signals 268, and early warning procedures were not integrated to the suppliers. Suppliers lack access to data 269 to comply with TREAD reporting requirements.

Figure 3:
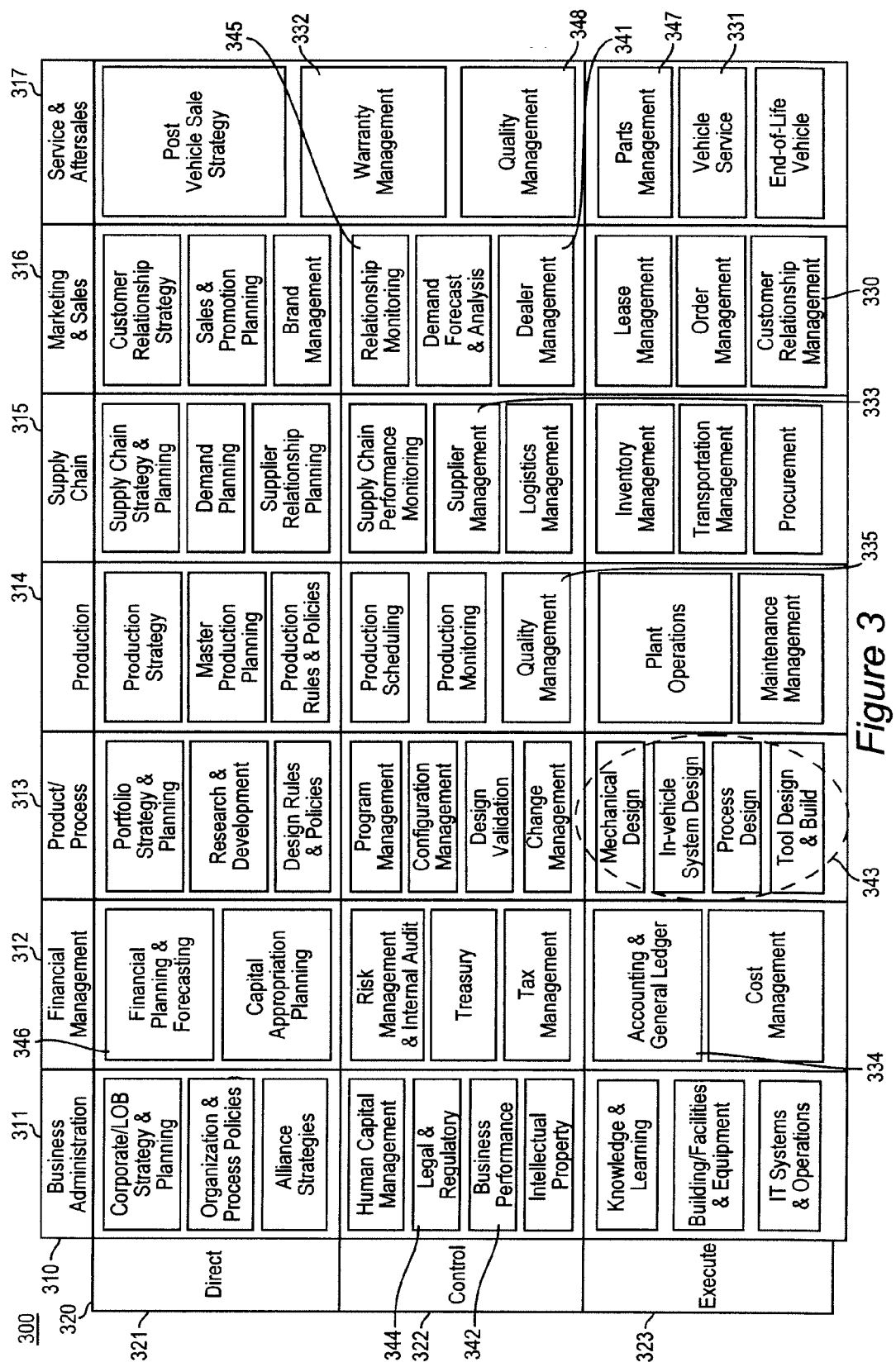
FIG. 3 is a diagram showing a component business model (CBM) map of the automotive manufacturer.

In order to leverage component business model (CBM) tools to relieve these pain points, it is important to relate the warranty process to a CBM map of the business. The handling of warranty claims may be understood from a variety of viewpoints using CBM, and in particular by use of the CBM map as shown in FIG. 3. The CBM map 300 is an industry map applicable to vehicle manufacturers (OEMs 183), and lays out the individual building block components of an automobile OEM in a matrix that defines the relative management levels 320 and business competencies 310 (i.e. the broad functional specializations) of the business. The business competencies 310 applicable to the automobile manufacturing industry are business administration 311, financial management 312, products and processes 313, production 314, supply chain 315, marketing and sales 316, and service and after sales 317.

The components within each of these competencies are grouped into operational management levels 320 reflecting the scope and intent of activity and decision making applicable to the components. These levels are summarized as direct 321 components (i.e. components that serve to define policy, plans, goals, organization and budgets, and assess overall performance of the business), control 322 components (i.e. components involved with allocating tasks and resources, authorizing execution, applying policy, interpreting goals, and overseeing and troubleshooting performance), and execute 323 components (i.e. components for administering, maintaining and operating the business).

A business component (e.g. customer relationship management 330) is the basic building block of an organization. It is a cohesive group of business activities supported by appropriate processes, applications, infrastructure and metrics, all of which define the contribution of the component to the performance of the business. Components are non-overlapping partitions of business activity, that is, components must have boundaries for their separate cohesive groups of business activities that are simultaneously coincident with respect to a) functional purpose, b) organizational role and authority, c) skill levels required, and d) operational and technical needs.

Each component operates by calling and offering business services. The specialization and expertise of a component is encapsulated as far as possible. A component works under a "managing concept" (as that term is defined in the above referenced foundation patent application), which is responsible for each instance of the component over the lifetime of the instance. Each business competency 310 in the industry map 300 is formed from a managing concept or from a combination of managing concepts. Often, and preferably, within a competency 310 a component (e.g. 330) defines a boundary with respect to other components that enables the component to be outsourced with little or no disruption of the business.

Figure 4A:
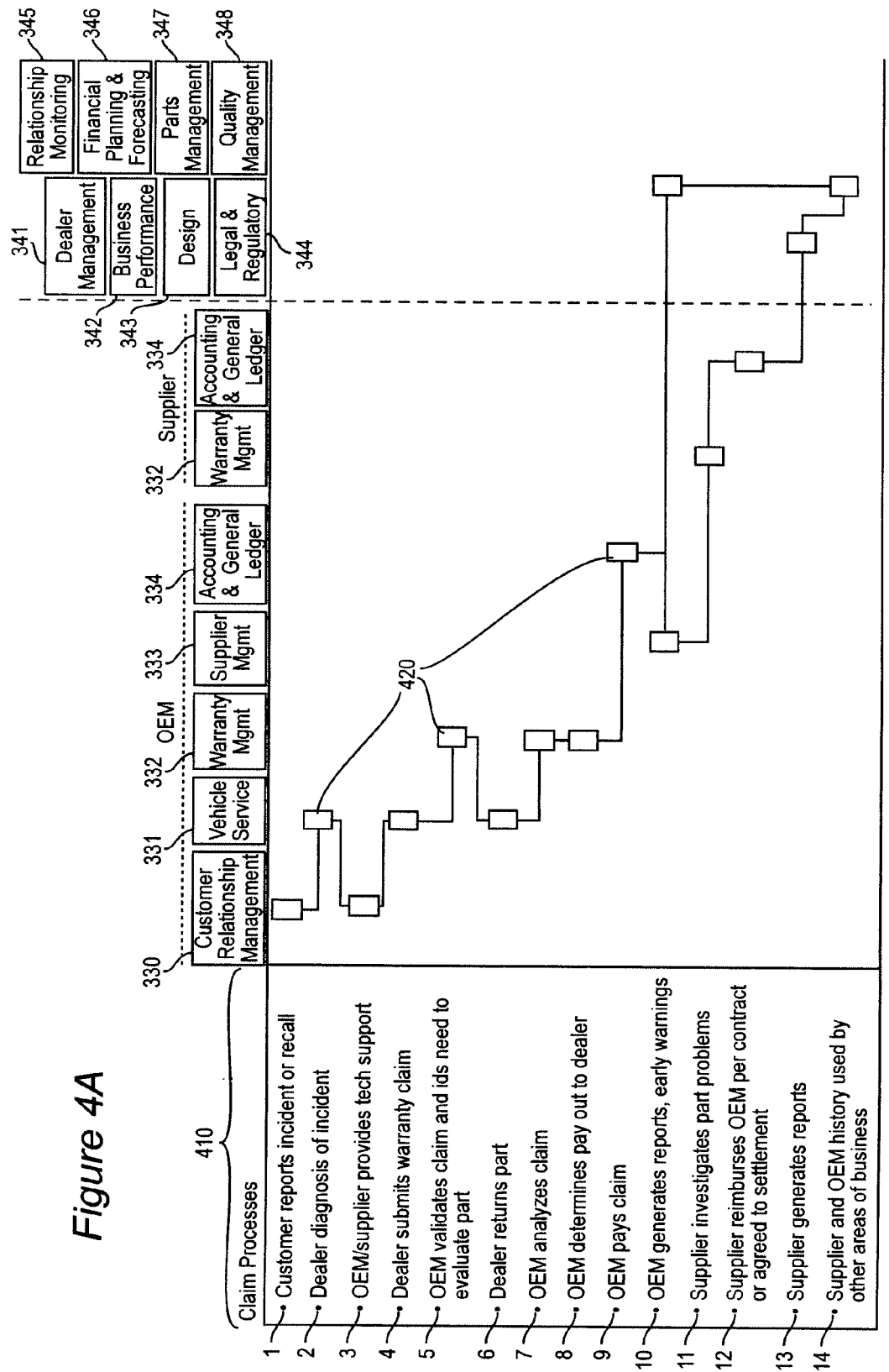
FIG. 4A is a sequential layout of the claims administration process steps shown in FIG. 2A arrayed under the components shown in FIG. 3.
Figure 4B:
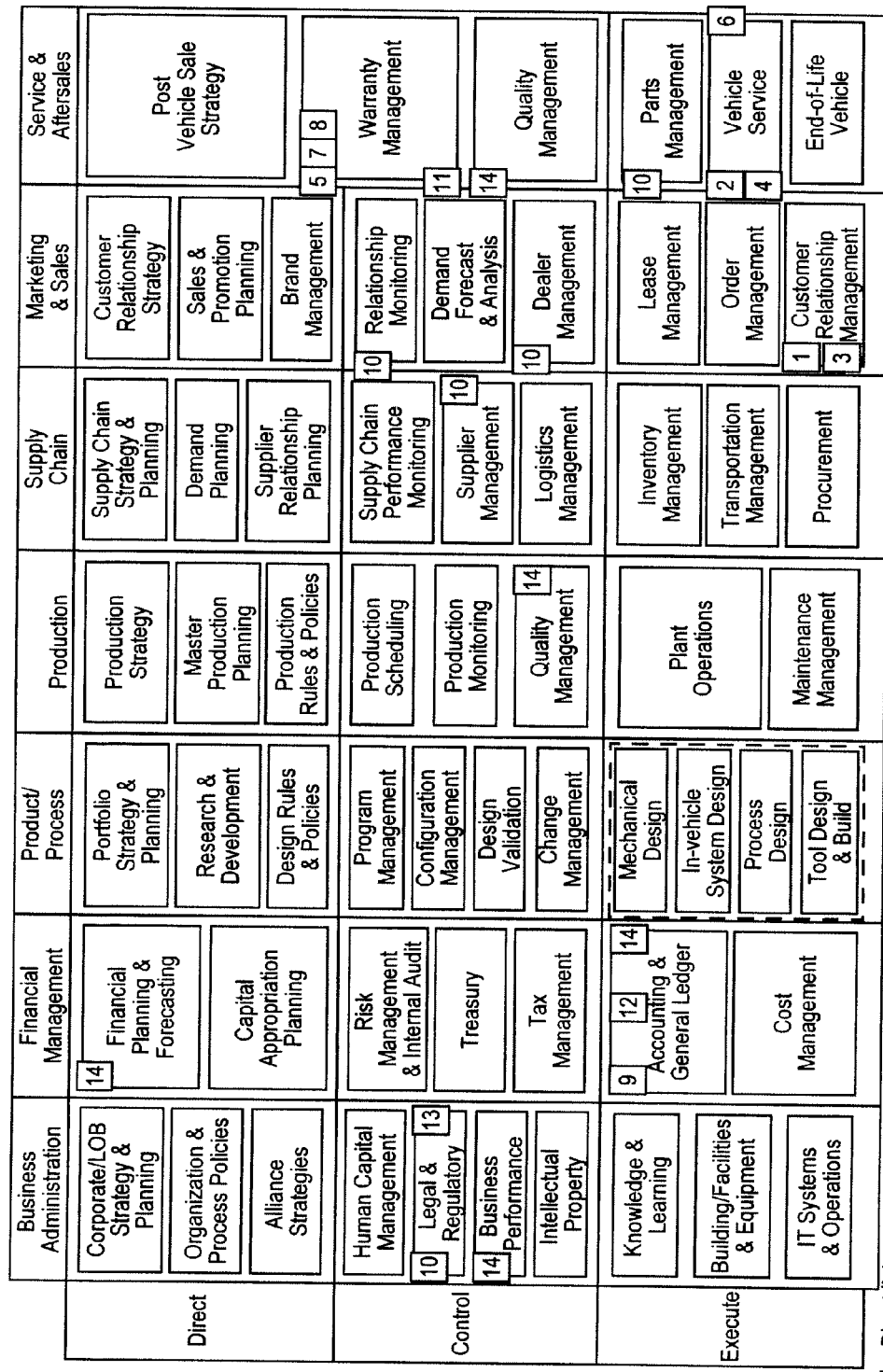
FIG. 4B is a mapping of the claims administration process steps shown in FIG. 4A onto the component business model shown in FIG. 3.

The warranty claims administration process affects a subset of components, cutting across business competencies 310 and management levels 320. These components are shown on the CBM map 300 in FIG. 3 and are also shown as column headers in FIG. 4A. The representation in FIG. 4A shows the warranty claim processes 410 (items 1 through 14) as a series of linked process steps which touch components of the CBM map 300, as shown by the indicators (e.g. 420) beneath a column header and to the right of the indicated process step. The components touched by each process step 410 are also shown by the numbered indicators overlaid upon the CBM map as shown in FIG. 4B.

In the initial process step, a customer reports an incident or responds to a recall notice 1, thereby invoking the customer relationship management component 330. A dealer then diagnoses 2 the incident, which is an activity supported by the vehicle service component 331. Technical support is provided 3 to the dealer by the OEM and perhaps also the supplier, again implicating the component 330 that manages the customer relationship. Following diagnosis 2, the dealer submits the warranty claim 4, another activity handled by the vehicle service component 331.

The warranty management component 332 is used for OEM validation of the claim 5, analysis of the claim 7, and determination 8 of the pay out due the dealer. If the OEM identifies a need 5 to evaluate a failed part, dealer return of the part 6 is handled by the vehicle service component 331. Payment 9 of the claim is an activity of the accounting and general ledger component 334. Then the OEM generates 10 reports and early warnings, which includes coordination with the supplier, an activity of the supplier management component 333, as well as a number of additional activities handled by certain other components, namely, the legal and regulatory component 344, the relationship monitoring component 345, and the parts management component 347.

Supplier investigation 11 of part problems is supported by an activity of the warranty management component 332. Supplier reimbursement 12 of the OEM, in accordance with contract terms or a negotiated settlement, is handled by the accounting and general ledger component 334. The supplier also generates reports 13, and handling these reports is an activity of the legal and regulatory component 344. Finally, supplier and OEM histories generated by the warranty process are used 14 by other areas of the business, invoking a number of other components, namely, business performance 342, financial planning and forecasting 346, quality management 348 (in both the production 314 and service and after sales 317 competencies), and a group of design components 343 in the product/process competency 313.

Figure 5A:
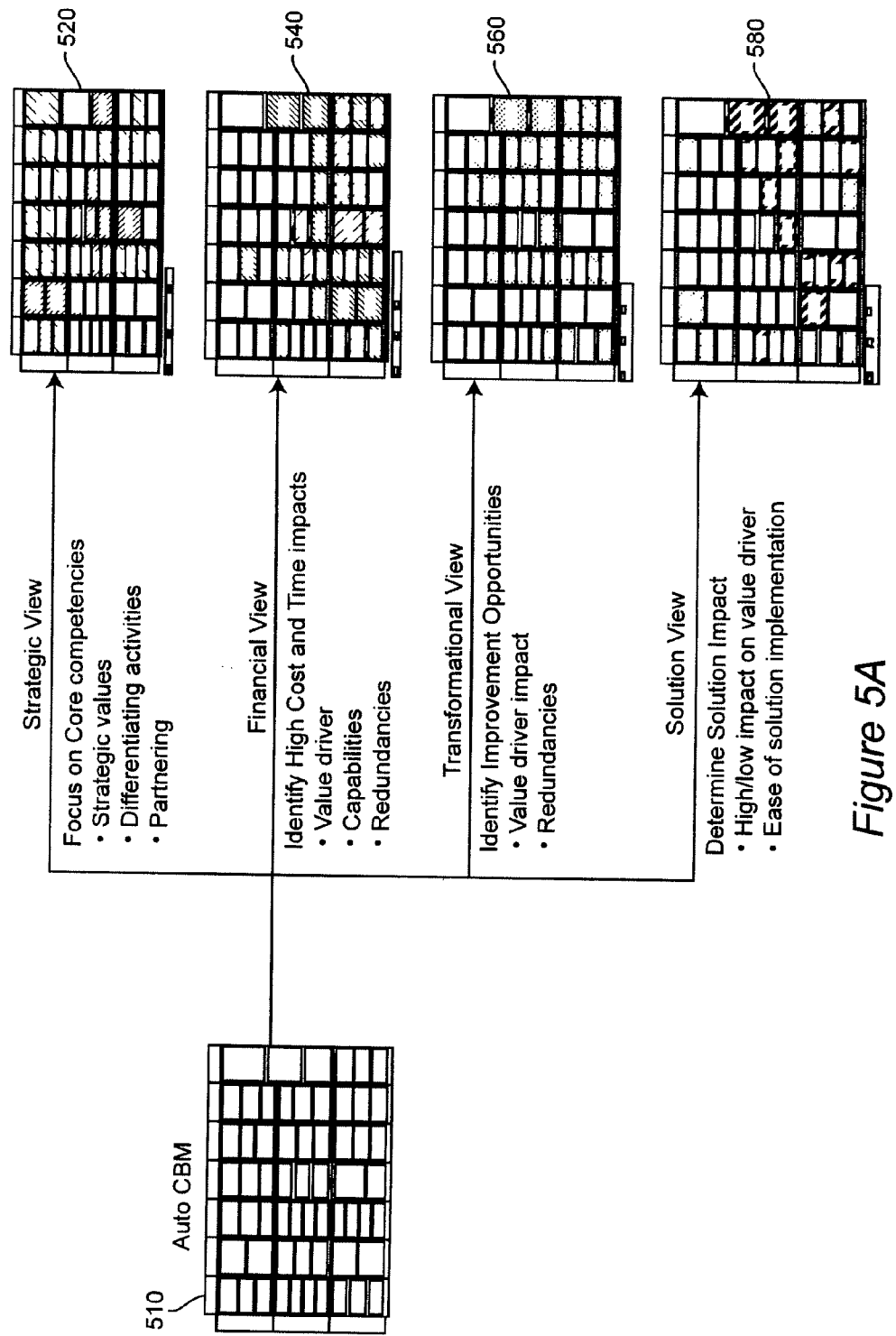
FIG. 5A is a schematic linking the automotive CBM map of FIG. 3 to overlays upon that map showing strategic, financial, transformational and solution views overlaid upon that map.

Having thus used the automobile manufacturing industry CBM map to identify the components affected by warranty claims processing, the next phase in using CBM tools to relieve the pain points identified in FIG. 2B is to use the auto industry CBM map 510 to generate views of the business that highlight components that most affect the value of the business, as outlined in FIG. 5A. In general, these views are "heat maps" as described in the above referenced foundation patent application, but in the present invention they are combined and adapted for use in improving warranty claims processing.

Strategic view 520 focuses on core competencies, identifying components that provide strategic value to the automobile manufacturing business, components that perform activities that differentiate the business from competitors, as well as components that can provide better value to the business through partnering arrangements. A detailed map of strategic view 520 is provided in FIG. 5B. Components that provide strategic value, whose performance can differentiate the business from competitors, such as post vehicle sale strategy component 525, are shown with a "Strategic" key. A second group of components, such as quality management 530 (shown with a "Competitive Parity" key), are components whose performance must be at industry standard levels, maintaining competitive parity with others in the automobile manufacturing business. A third group of components, such as parts management 535 (shown with a "Basic" key), provide basic functionality for the business and can be operated as cost effectively as possible, at minimum acceptable levels of performance.

Financial view 540 is tailored to identify high cost and time impacts of the components, because cost and time are key performance indicators for the warranty process. More broadly, however, other key performance indicators may be appropriate, depending on the business process being transformed.

The financial view 540 is used to focus attention on priority value drivers and capabilities, and indicate the financial consequences of removing redundancies. A detailed map of financial view 540 is provided in FIG. 5C. Components that have a high capital investment, such as maintenance management 545, are shown with a "High Capital" key and dashed border. A second group of components, such as customer relationship management 550 (shown with a "High Cost" key), are components having a high operating cost. A third group of components, such as end-of-life vehicle component 555 (shown with a "High Capital+High Cost" key and dashed border), are characterized by both high capital investment and high operating cost.

Transformational view 560 identifies those components that provide the best opportunities for improvement and process changes. CBM may be used to understand the linkage to components to create a prioritized portfolio of transformation initiatives. A detailed map of transformational view 560 is provided in FIG. 5D. Components that are an immediate priority for improving the warranty process, such as quality management 565, are shown with an "immediate priority" key and dashed border. A second group of components, such as parts management 570 (shown with a "medium priority" key), are components whose impact on improving the warranty process is significant but less than for immediate priority components and which therefore have a medium priority. The remaining components, such as the post vehicle sale strategy component 575, are those having no impact and therefore no priority for transformation, and are shown with a "no action" key.

Solution view 580 shows which proposed solutions, in light of the strategic, financial and transformational views, have the highest impact on reducing the key performance indicator of time required to resolve a claim. This view may be used to understand the impact of proposed solutions on each component, and evaluate the ease or difficulty of solution implementation. The strategic, financial and transformation views provide the business decision maker with a depth of perspective that enables the business to select for action those solutions that best align with the overall goals of the business within the constraints of available time and resources. A detailed map of solution view 580 is provided in FIG. 5E. Exemplar components that are selected for action as likely to have the most direct impact on reducing warranty claim processing time within the business framework of available constraints, such as quality management 585, are shown with a "direct impact" key and dashed border. A second group of components, such as parts management 590 (shown with a "partial impact" key and a dotted border), are components having a partial or indirect impact on reducing warranty claim processing time. The remaining components, such as post vehicle sale strategy, have no impact on a solution that is consistent with the overall goals of the business within available constraints, and are indicated by a "no impact" key.

Figure 5B:
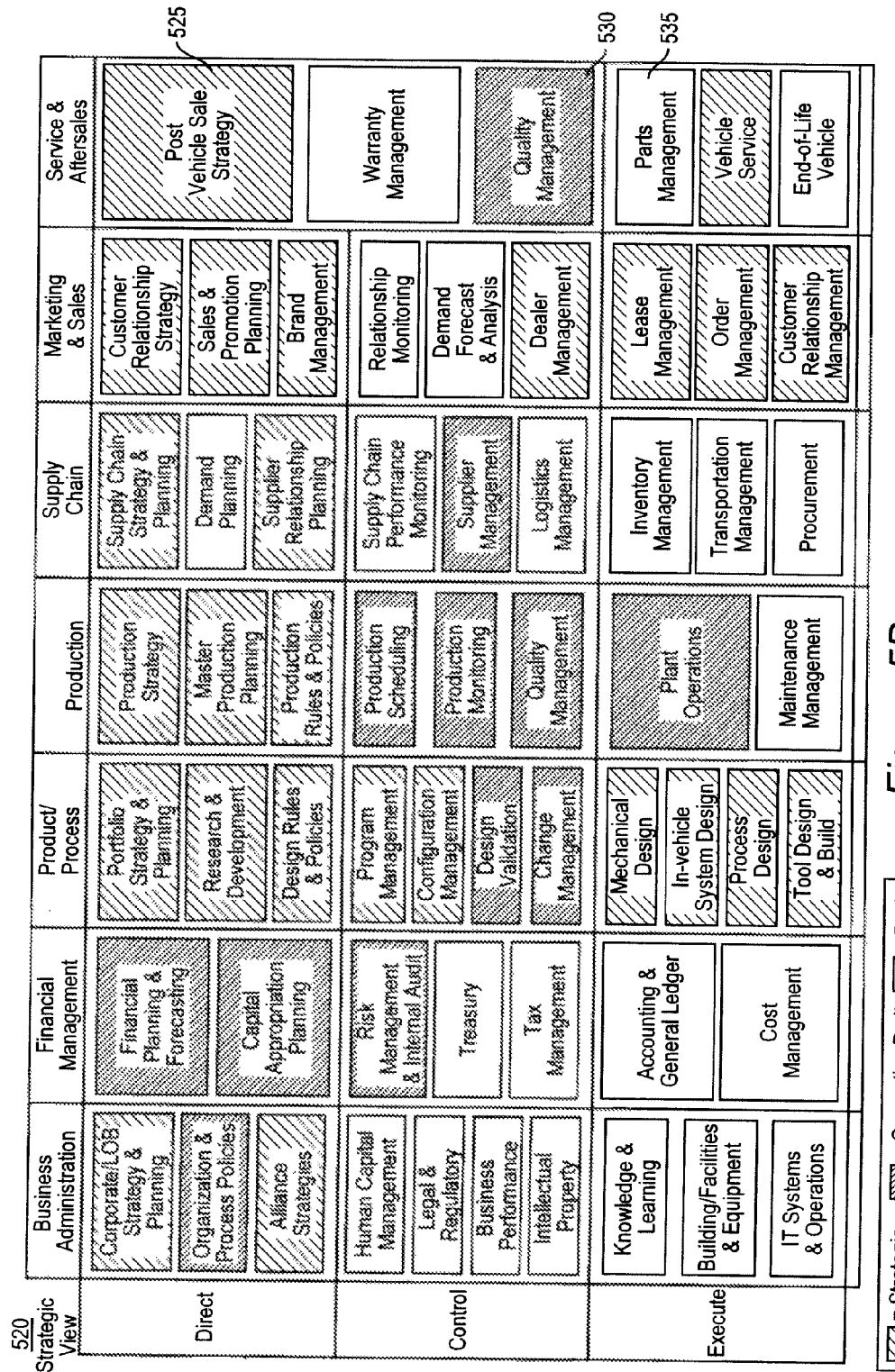
FIGS. 5B, 5C, 5D and 5E, respectively show the strategic view, the financial view, the transformational view and the solution view overlays.
Figure 5C:
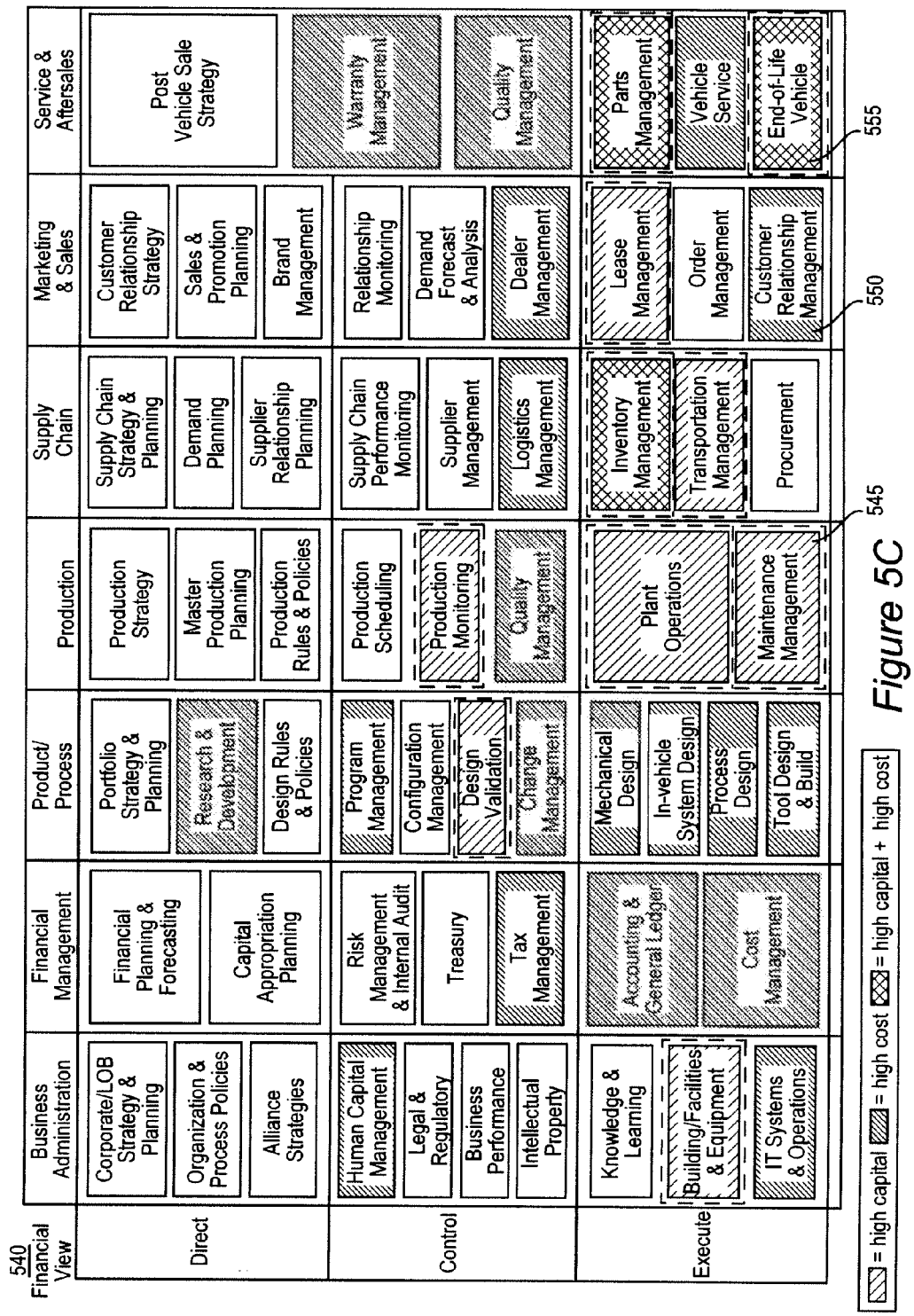
Figure 5D:
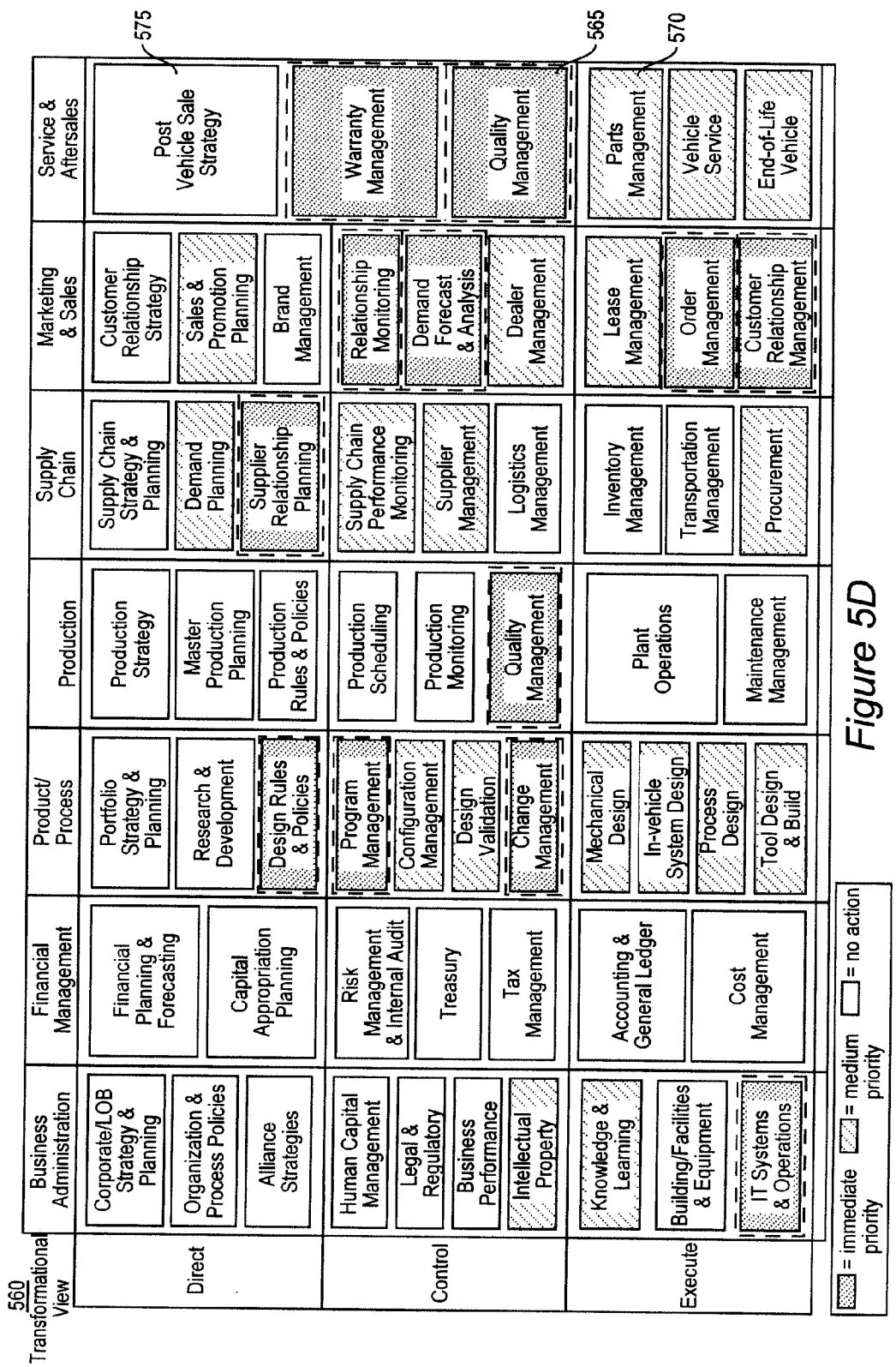

FIGS. 5B through 5D provide detail as to which components are impacted if you take a strategic, financial, or transformational of the warranty problem. These views provide evaluation criteria for determining the priority of components in the solution view shown in FIG. 5E. These priority components identified in the solution view are then analyzed in increasing detail to identify opportunities to reduce the high cost of warranty, as shown in FIG. 6. FIG. 6 shows how two exemplar components 610, warranty management 332 and quality management 348, are broken down into activity levels 620. Each of these component activity levels is then analyzed according to the same criteria applied to components in the strategic 630, financial 640, transformational 650 and solution 660 views, respectively, as shown in FIGS. 5B through 5E.

Consider, for example, the warranty management component 332. As will be recalled from FIGS. 5B through 5E, the strategic view 520 shows this component being operated at a basic level in terms of the strategic focus of the automobile manufacturing business. That is, excellent performance of this component would not differentiate the business from competitors, nor was this component strategic enough to require operation at a level of parity with that of competitors. A minimum level of resources and attention would be strategically adequate for this component. As shown in FIG. 6, a further analysis of activity levels within this component under the strategic view 520 confirms this conclusion for each activity level within the warranty management component 332. With respect to the cost criteria used for evaluation in the financial view 540, the high cost of the warranty management component 332 is traceable to two of the four activity levels: monitoring and tracking warranty and repairs 623; and managing claims 624. These same two activity levels are also responsible for the immediate priority evaluation given to this component in the transformational view 560, and for the direct impact evaluation given to this component in the solution view 580. But at this more detailed level of analysis, warranty communication, in the form of the activity of notification/recall 622, has only a partial impact on solution to the problem of reducing warranty claim processing time, and communication of the initial warranty transaction 621 has no impact at all.

Figure 5E:
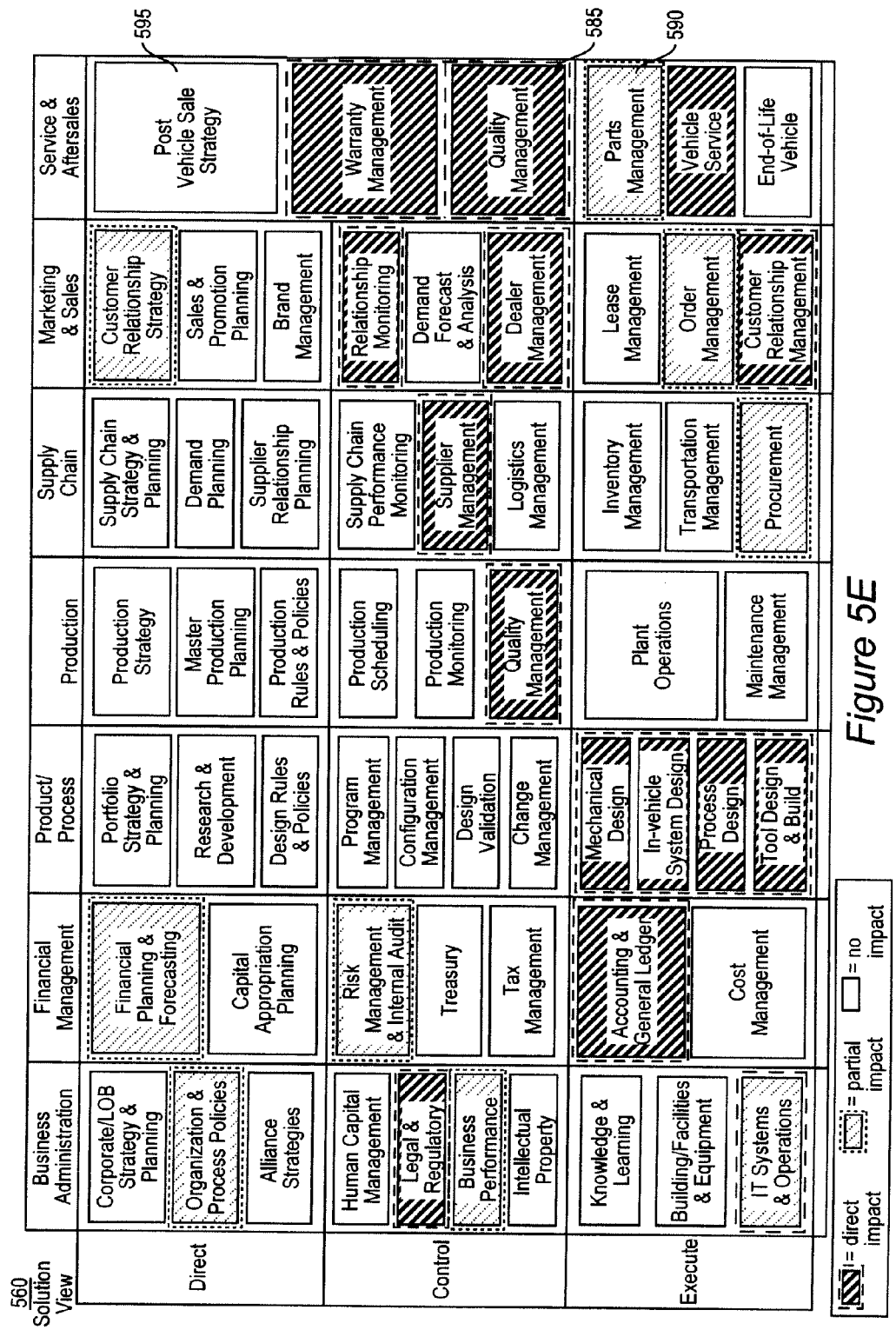

A similar detailed analysis of activity levels is shown in FIG. 6 for quality management component 348. Applying the criteria of the strategic view 520, at shown in FIG. 5B, this component must be operated at competitive parity in relation to business competitors in automobile manufacturing, an evaluation 630 which applies as shown in FIG. 6 to all activity levels 620 within this component except regulatory compliance 629. With respect to the cost criteria used for evaluation in the financial view 640, the high cost of the quality management component 348 as shown in FIG. 5C is traceable to three activity levels: identifying quality issues 625; monitoring and diagnosing parts 626; and analyzing early warning data 627. However, all five activity levels are evaluated as having immediate priority in the transformational view 650. And the "direct impact" evaluation of the quality management component 348 in the solution view 580, as shown in FIG. 5E, applies three activity levels: identifying quality issues 625; analyzing early warning data 627; and providing feedback to the enterprise 628. The monitoring and diagnosing parts 616 has only a partial impact on reducing warranty claims processing time and regulatory compliance 629 has no impact at all.

Thus, from these two examples of how warranty issues can be decomposed, evaluated, ranked and prioritized, it will be seen that the more detailed analysis of activity levels within a component, according to the criteria used in the various CBM views, more particularly identifies areas for further action. It should be noted that those activity levels identified in the solution view 660 as having a direct impact on reduction of the time required to resolve a claim include those having relatively low evaluations in the strategic view 520 and the financial view 540.

Figure 7A:
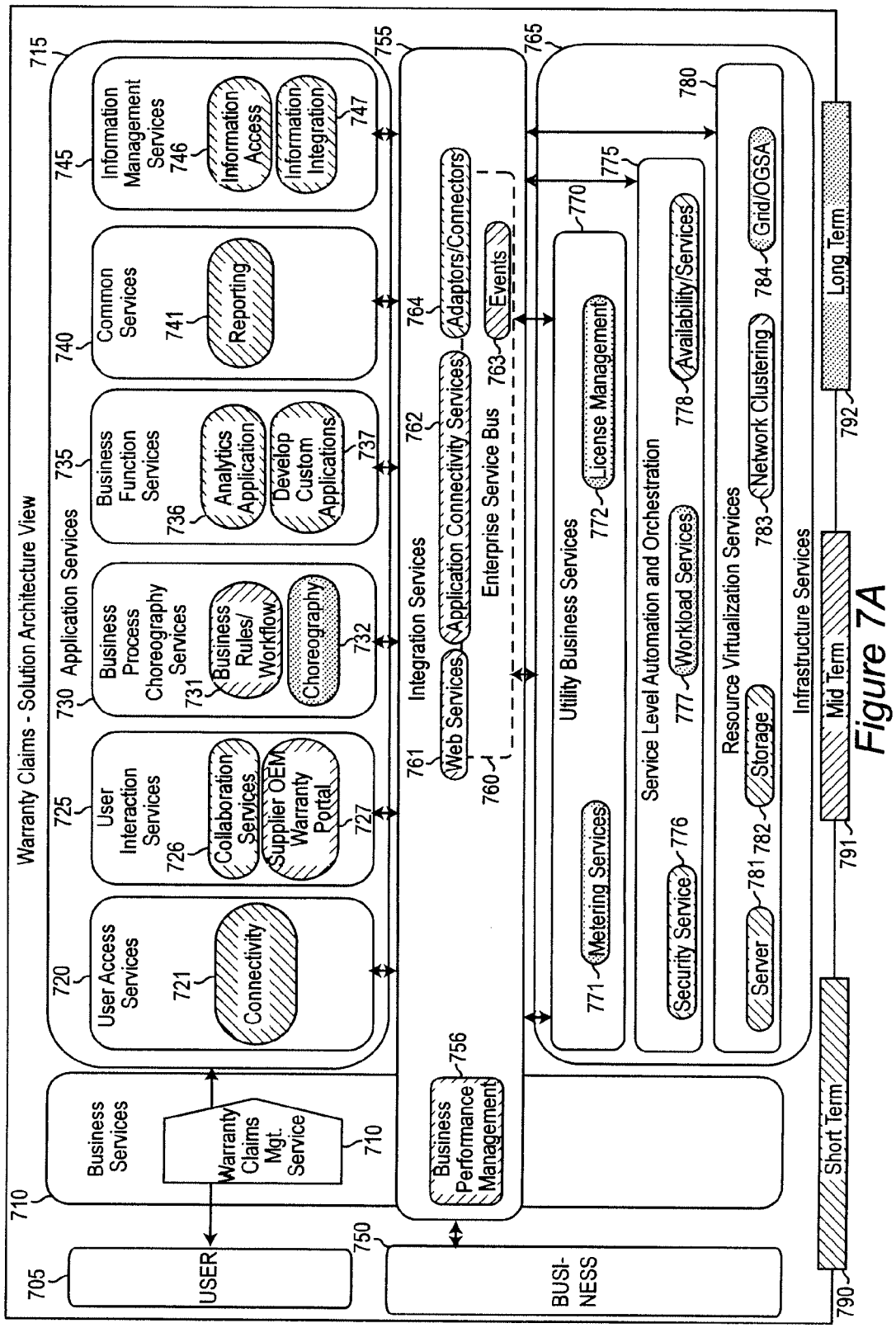
FIG. 7A is a graph of a baseline architecture showing IT applications and systems particular to warranty issues.
Figure 7B:
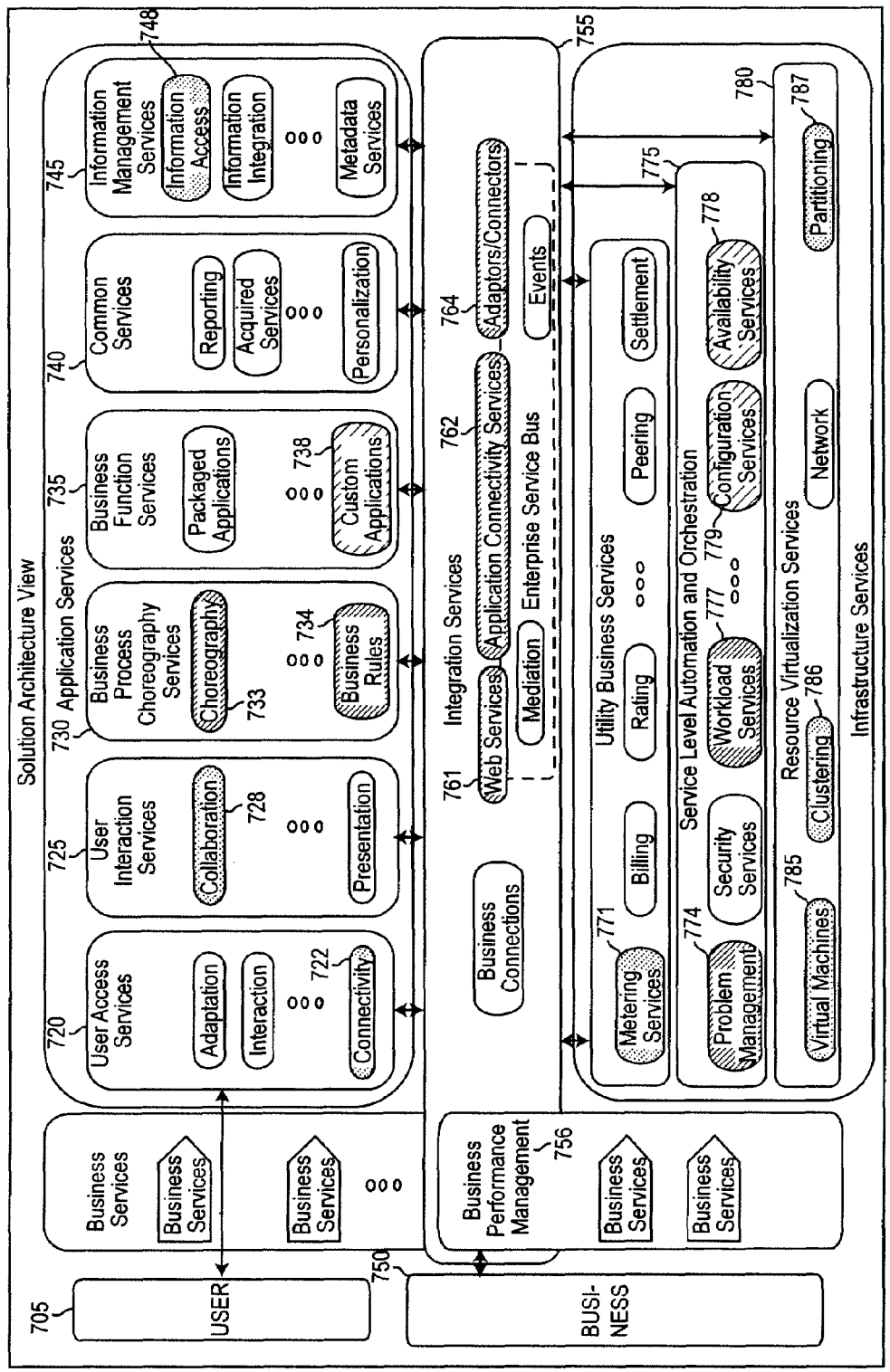
FIG. 7B is a target version of the Solution Architecture View (SAV) shown in FIG. 7A adapted to reflect prioritized business requirements identified using the component business model.

The utility of the CBM analysis may be further understood by reference to FIGS. 7A and 7B. FIG. 7A defines a baseline solution architecture view (SAV) considering corporate IT standards and dependencies applicable to warranty issues. The information technology architecture of the business has been overlaid with applications and systems particular to warranty issues. The architecture shown provides a business services interface 710 (including warranty claims management service 712) for user 705. This is supported by application services 715, which is further comprised of user access services 720, user interaction services 725, business process choreography services 730, business function services 735, common services 740, and information management services 745. The business 750 is further supported by infrastructure services 765 (which is further comprised of utility business services 770, service level automation and orchestration 775, and resource virtualization services 780) and connects to user application services 715 via integration services 755.

The baseline SAV reflects the current state of IT, with an indication of elements to be improved in the short term (see "short term" key 785), the mid term (see "mid term" key 786) and the long term (see "long term" key 787). As shown in FIG. 7A, the baseline SAV indicates that the elements to be improved in the short term include a number of elements within application services 715 (connectivity 721, collaboration services 726, analytics application 736, develop custom applications 737, reporting 741, information access 746, and information integration 747), a number of infrastructure services (security services 776, availability services 778, server 781, and storage 782), and adaptors/connectors 764 on the enterprise service bus 760.

Similarly, elements targeted for improvement in the mid term include a supplier OEM warranty portal 727 and business rules/workflow 731 within application services 715, network clustering 783 within resource virtualization services 780, business performance management 756 within integration services 755, and a number of elements on enterprise service bus 760 (web services 761, application connectivity services 762, and events 763. In the long term, choreography 732 is targeted for improvement, together with metering services 771 and license management 772 within utility business services 770, workload services 777 within service level automation and orchestration 775, and Grid/OGSA (Open Grid Services Architecture) 784, a resource virtualization service 780.

Figure 8A:
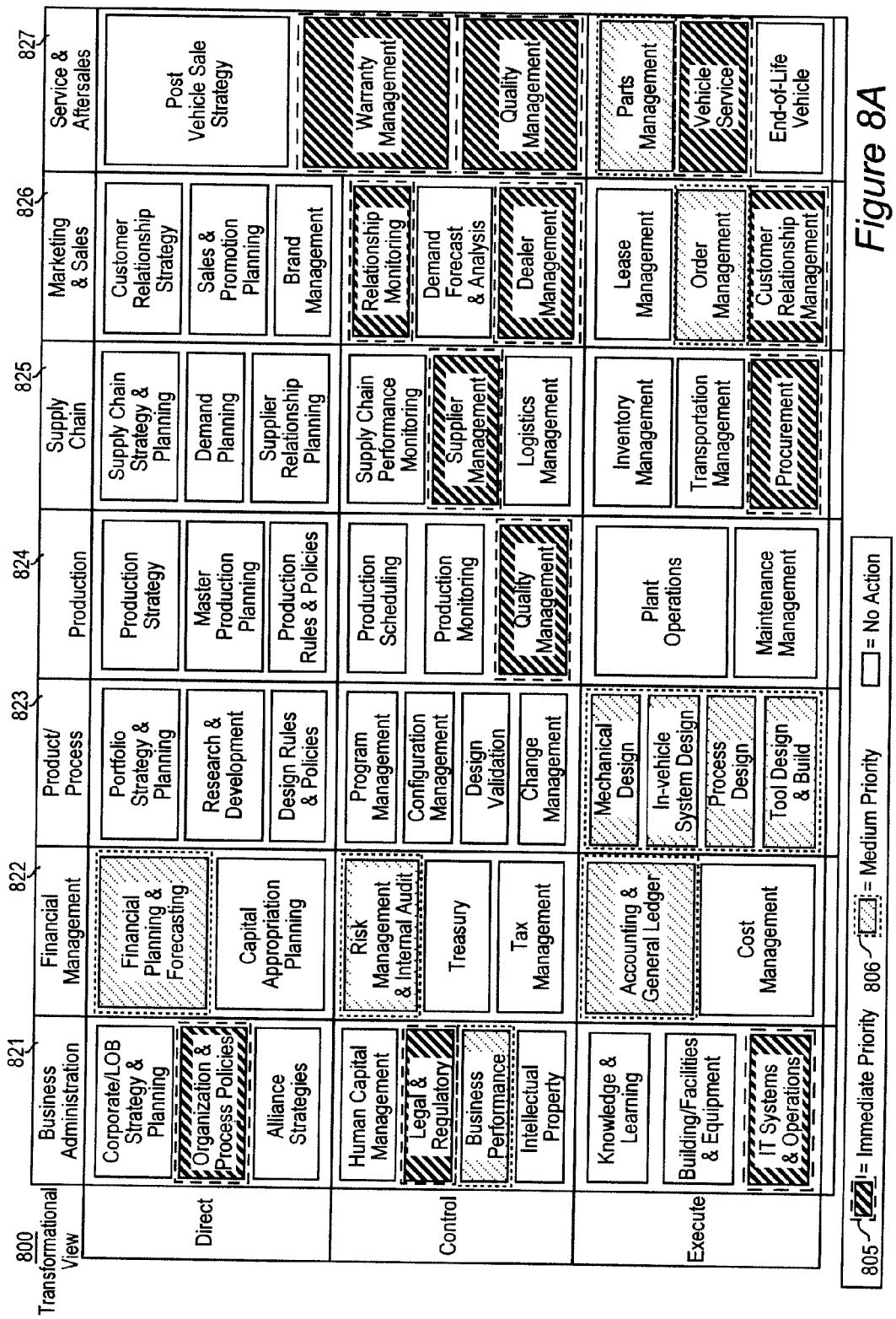
FIG. 8A is a transformation view overlay upon the CBM map of FIG. 3 showing priorities for IT applications.

Having established a baseline SAV, the next step is to use a map of CBM priorities for transformation as a tool to understand the information systems requirements of the company. An exemplar CBM transformational view 800 is shown in FIG. 8A. Those components assigned an immediate priority (see the "immediate priority" key) are indicated with a dashed line border. These include the following components: the organization & process policies, legal & regulatory, and IT systems & operations components, within the business administration managing concept 821; the quality management component within the production managing concept 824; the supplier management, and procurement components, within the supply chain managing concept 825; the relationship monitoring, and customer relationship management components, within the marketing and sales managing concept 826; and the warranty management, quality management, and vehicle service components within the service and aftersales managing concept 827. Those components given a medium priority (see the "medium priority" key) are indicated with a dotted line border. These include the following components: the business performance component within the business administration managing concept 821; the financial planning and forecasting, risk management and internal audit, and accounting and general ledger components, within the financial management managing concept 822; the mechanical design, in-vehicle system design, process design and tool design & build components, within the product/process managing concept; the dealer management and order management components, within the marketing & sales managing concept 826; and the parts management component, within the service & aftersales managing concept 827.

Figure 8B:
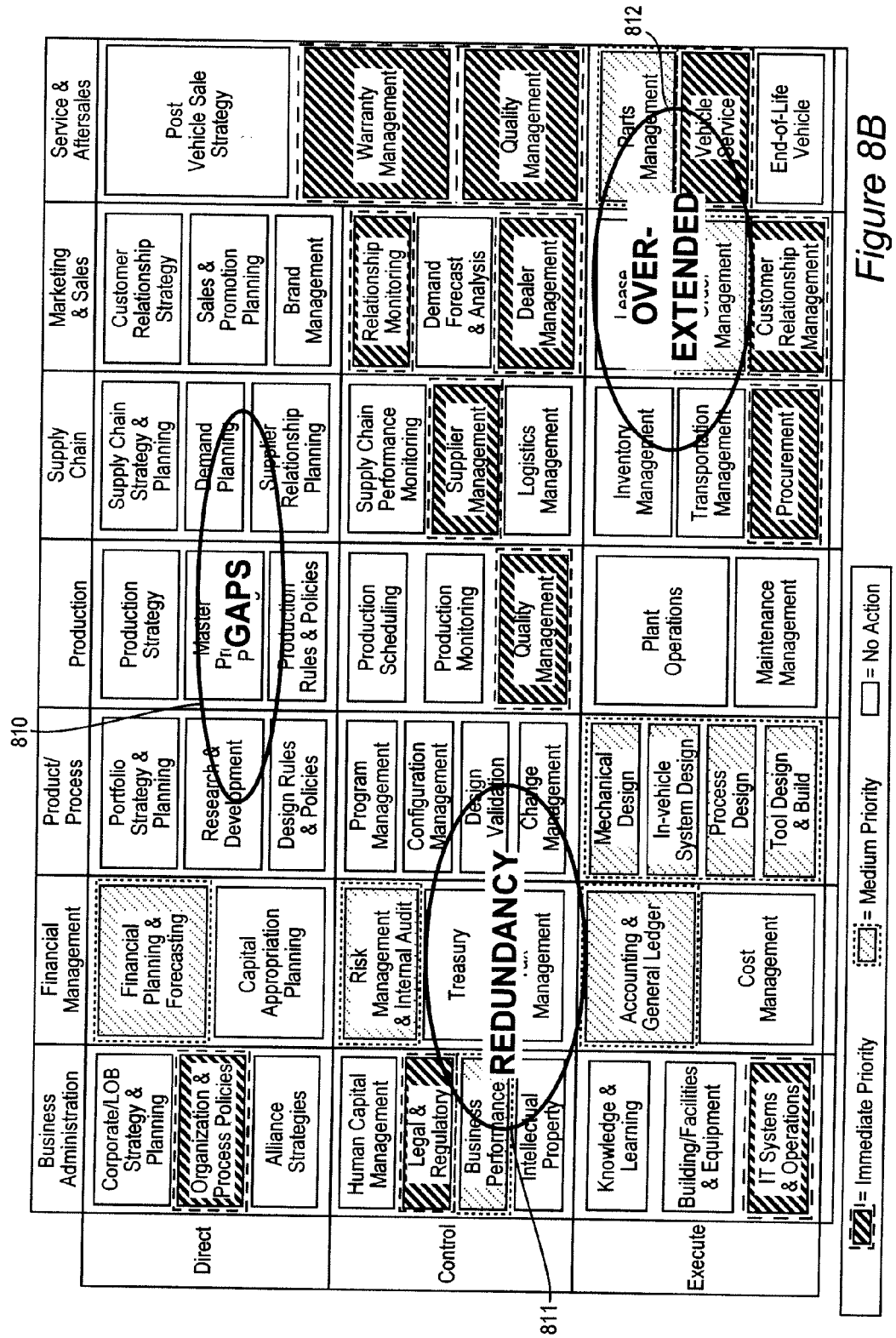
FIG. 8B shows gaps, redundancies and overextensions of current IT systems identified using the component business model.

The map of CBM priorities 800 is then used identify gaps, redundancies and over-extensions of current information systems. A conceptual representation of this understanding is shown in FIG. 8B, with an exemplar gap 810, redundancy 811 and over-extension 812. Those skilled in the art, and having reference to the above referenced foundation patent application, will recognize that IT shortfalls become evident when a company's particular information systems are overlaid upon a CBM map of the components serviced by these systems. The information systems overlay is not shown.

Figure 9:
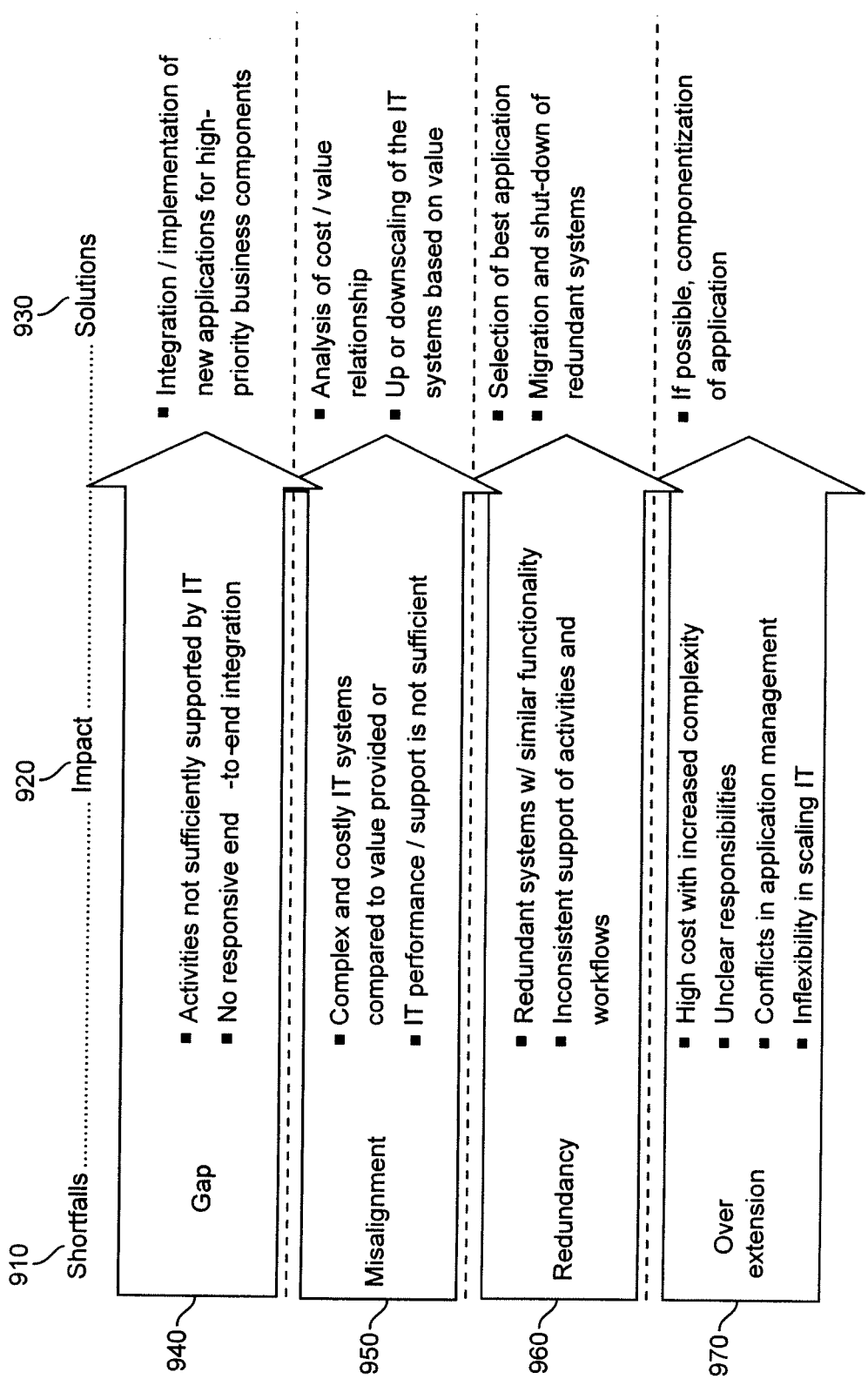
FIG. 9 is a chart connecting IT shortfalls with possible solutions.

FIG. 9 summarizes the impact 920 of IT shortfalls 910, and their solutions 930. Possible solutions are identified and implemented to align IT applications to a target business component model of the enterprise. When IT systems are overlaid upon a CBM map, gaps 940 will readily appear, i.e. activities that are not sufficiently supported by IT, or where there is no responsive end-to-end integration. This assessment points to an IT solution that integrates related activities or implements a new application to service high priority components. An overlay of IT systems will also identify misalignments 950, where there is a mismatch between the cost and complexity of supporting IT systems and the value provided to the business by the supported components. This assessment points to an IT solution that scales the IT system appropriately. Redundancies 960 will also become evident with an overlay of IT systems, where there are multiple systems having similar functionality, providing inconsistent support of activities and workflows. This assessment points to an IT solution that selects the best application and then migrates the application to cover the redundant applications, which are then shut-down. A further shortfall uncovered by an overlay of IT systems is an over-extension 970, that is, where an application designed for one purpose is adapted and extended to serve other purposes across other components, but at high cost with increased complexity and unclear responsibilities, and with conflicts in managing the application and inflexibility in scaling the application. This assessment points to an IT solution that breaks the application up so that different components have their own appropriately tailored and responsive application.

Figure 2C:
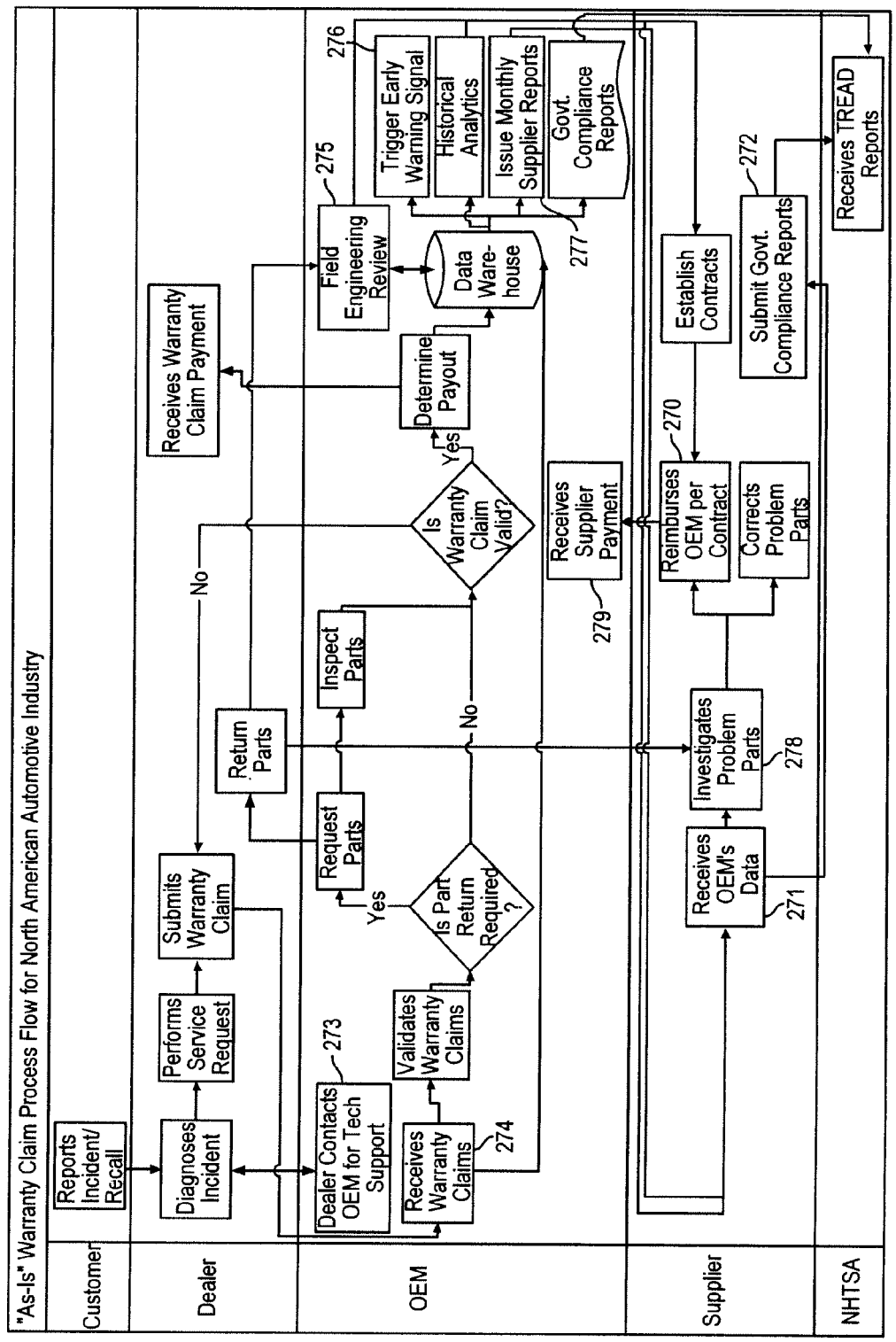
FIG. 2C highlights key points related to the capabilities of information technology (IT)

The next step is to review the process and key pain points related to IT capabilities, as may be shown with reference to FIG. 2C. One issue is primarily an OEM issue: time consuming negotiation with the supplier to attribute accountability because of disputed debits to suppliers. This adversely affects reimbursement to the OEM 270. Several additional issues are primarily supplier issues. The supplier receives OEM data 271, but the supplier has limited access to the data (OEM reports), and where the data is provided there is a lengthy cycle time from the incident to receipt of the data. Further, there is a direct cost to the supplier for access to multiple OEM warranty systems. An additional supplier issue is with respect to submission of government compliance reports 272: suppliers lack access to data to comply with TREAD reporting requirements.

However, most issues that are pain points for the industry and delay the warranty claims process are shared by the OEM and supplier. Dealer contacts with the OEM for technical support 273 suffer because root cause findings are not captured and updating for the dealer and technical support and education does not proceed quickly. Warranty claims received by the OEM 274 reflect incomplete data capture from the dealer (e.g. lack of dealer narrative and vehicle configuration information). At field engineering review 275, timeliness and effectiveness of root cause assessment is hindered by lack of data integration and lack of advanced tools for the assessment of root causes. Few OEMs utilize early warning signals 276, and early warning procedures are not integrated to the supplier. The monthly reports issued by the OEM 277 provide suppliers with little actionable information. The suppliers lack tools and data to diagnose root causes when they investigate problem parts 278, and this contributes to a slow cycle time to respond with root cause identifications. Finally, there is a perception by suppliers that OEM warranty debits are inaccurate, which slows OEM reimbursement 270.

Figure 2D:
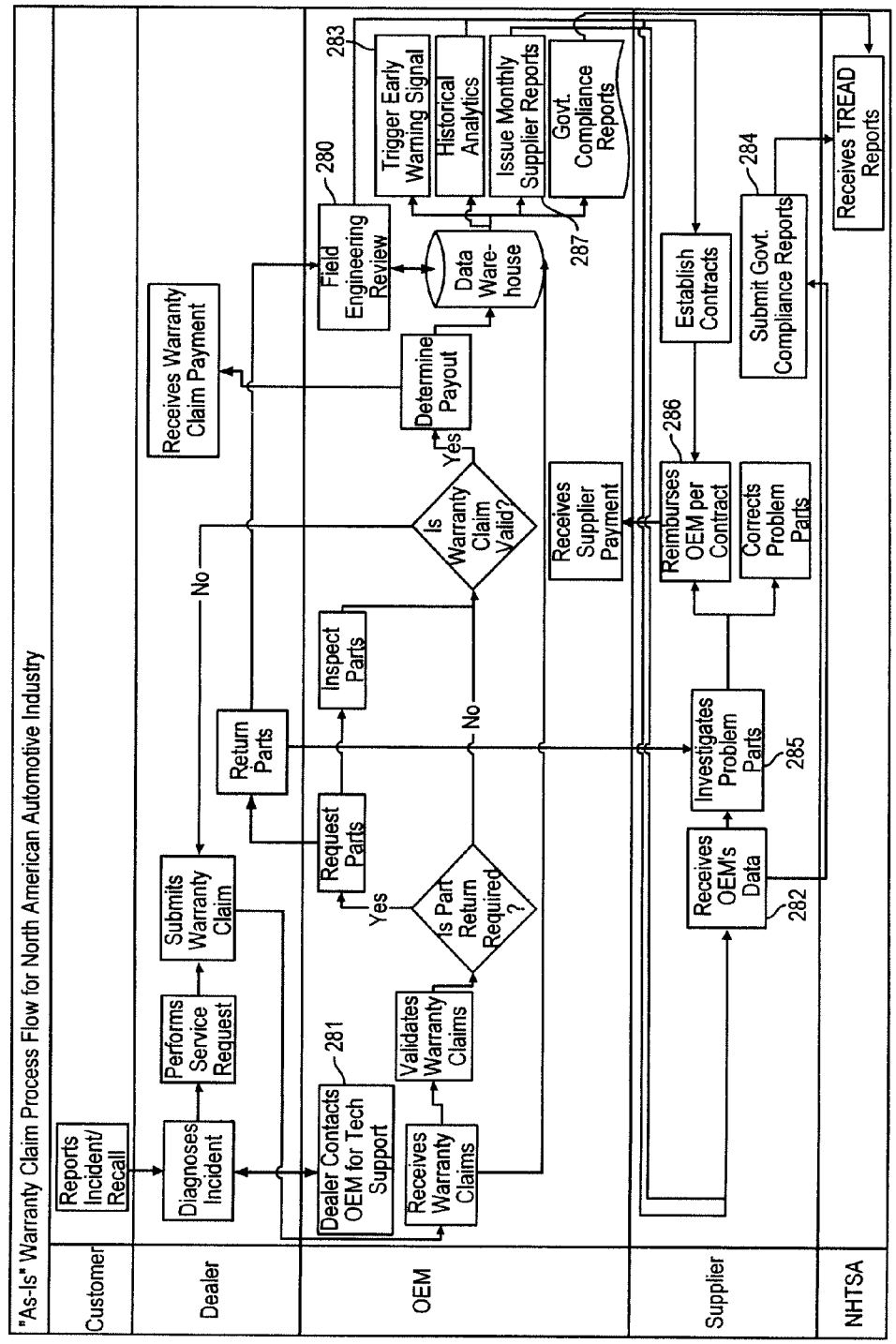
FIG. 2D highlights the business capabilities required to eliminate the pain points.

The next step is to map to the SAV the warranty process pain points identified with reference to FIGS. 2B, 2C and 2D. These pain points show that there are limited access channels for key participants, and therefore that user access services 720 must be improved. There is a lack of business orchestration processes, a deficiency of business process choreography services 730. Application functions are being duplicated, suggesting an improvement is needed in business function services 735. There is a need for common analytics functions, which requires expansion of common services 740. There are inconsistent data capture mechanisms, which is a responsibility of information management services 745. There are limited integration standards, which should be provided by integration services 755. Also, there are no cohesive sense and respond services, indicating a need for improvement in service level automation and orchestration 775.

The next step is to identify the business capabilities required to eliminate the pain points. These capabilities may be understood by turning again to the warranty claim process diagram, and in particular to FIG. 2D. First, an on demand technology infrastructure is required to support field engineering review 280, so that the warranty system captures broad claim data, including a dealer narrative, and so that there is shared access to data with suppliers to diagnose root causes. Comprehensive incident data, including dealer narrative, must be captured at the point of dealer contact of the OEM for technical support 281. A further aspect of on demand technology infrastructure that is required is greater access to claim data for suppliers 282.

Second, improved on demand analytics and reporting is needed to support triggering of early warning signals 283. There should be early warning triggers reflecting the complexity of components that are interconnected in less than optimal ways to components under warranty, with integration to suppliers and rapid reporting to suppliers. Further, advanced diagnostic tools (e.g. text mining) should be applied to the warranty claim information. Suppliers must receive the requisite data to comply with government reporting requirements 274. And suppliers must have on demand use of supporting analytical tools for investigation of problem parts 285.

Third, improved on demand collaboration is needed to provide Level 2 support for dealer diagnostics, with feedback from warranty diagnostics, when the dealer contacts the OEM for technical support 281. Data required to track accountability and debit suppliers appropriately must be captured in order to better support reimbursement of the OEM 286. In addition, there must be feedback systems to extend monthly supplier reports 287 to integrate field engineering and root cause findings back to dealer support components.

Figure 10:
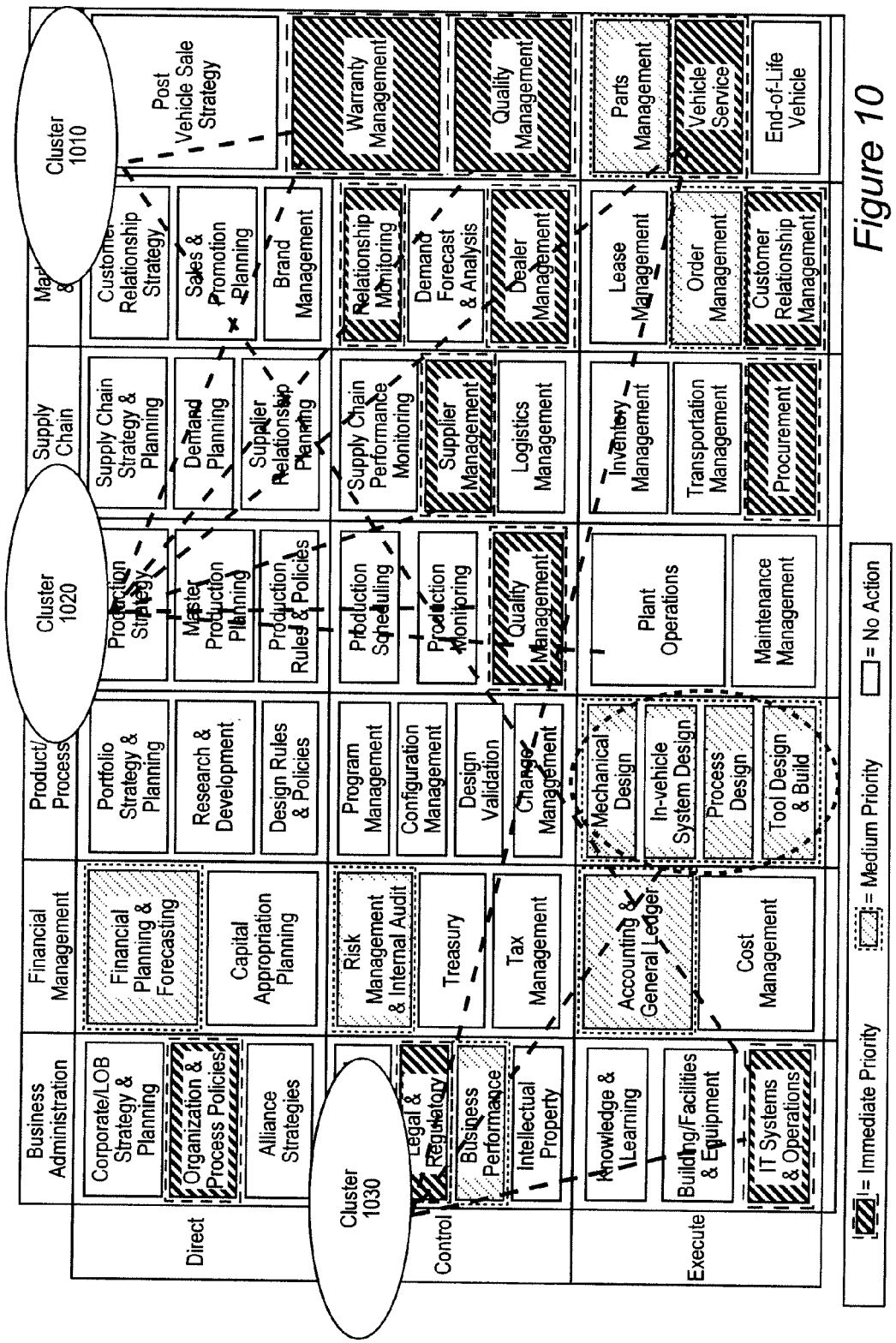
FIG. 10 is a map of CBM priorities overlaid with the business capabilities identified in FIG. 2D for eliminating the pain points.

The next step is to overlay these identified business capabilities on a CBM map of priorities for transformation, as shown in FIG. 10, which for illustrative purposes uses the transformational view of FIG. 3A as the foundation for the overlay. FIG. 10 shows a conceptual summary of such an overlay, indicating that the identified business capabilities affect certain components on the CBM map. To simplify the display, the identified business capabilities are grouped into clusters, cluster 1010, cluster 1020, and cluster 1030. One or more of the capabilities in each cluster affect the components indicated. However, those skilled in the art, and having reference to the above referenced foundation patent application, will recognize that a practical overlay will highlight those aspects of the affected components that must be transformed in order to enable the identified business capabilities. The details of such an overlay are not shown.

The next step is to define a "to-be" or target version of the solution architecture view using the prioritized business requirements from the CBM model and the required IT capabilities overlaid thereon. This will now be described with reference to FIG. 7B, where on demand technology infrastructure elements are applied to application services (connectivity 722, collaboration 728, and information access 748) and resource virtualization services for applications (metering services 771, virtual machines 785, clustering 786 and partitioning 787). Similarly, on demand analytics and reporting elements are applied to application services (choreography 733 and business rules 734), for the enabling of integration services (use of SOA and web services 761, application connectivity services 762, and adapters/connectors 764), and infrastructure services (problem management 774 and workload services 777). On demand collaboration elements are applied to application services (custom applications 735, to include consolidation and development of analytic applications for root cause corrective actions) and infrastructure services (configuration services 779 and availability services 778). In addition, common services are enhanced by leveraging diagnostic enablement tools, such as text mining, and business performance management 756 is enhanced to enable autonomic capabilities for sense and respond services.

Figure 11:
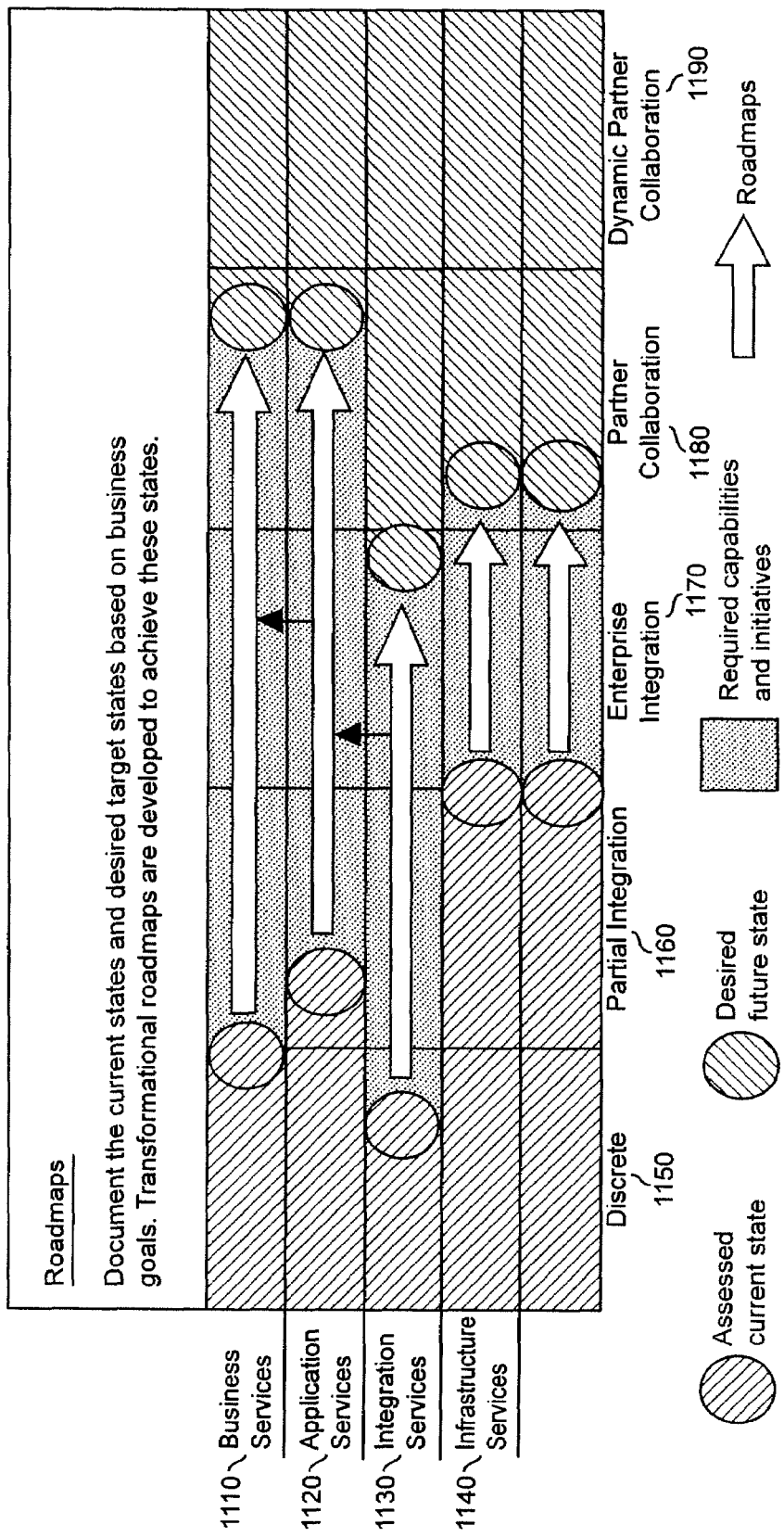
FIG. 11 is a chart showing a roadmap for transforming the current state of warranty services to a desired future state in order to resolve warranty issues.

The next step is to develop roadmaps for the transformations identified in connection with the foregoing, as shown in FIG. 11. For each of the areas covered by the SAV (business services 1010, application services 1020, integration services 1030 and infrastructure services 1040), an assessed current state and desired future state fall along a gradation from discrete services 1050 to partial integration 1060 to enterprise integration 1070 to partner collaboration 1080 and to dynamic partner collaboration 1090. The roadmaps document the assessed current state, the desired future state and the required capabilities and initiatives to transform the assessed current state so as to achieve the desired future state.

The results over time of following a roadmap are shown, by way of illustration, in FIG. 12. In the short term, through integration of disparate data, the solution significantly reduces processing and transaction cycle time throughout the enterprise, thereby speeding claim resolution. The technology provides collaborative applications to integrate data into a common repository to avoid duplication, and also provides normalization of data for consistent data interpretation. In the medium term the solution provides expanded inter-enterprise collaborative capabilities with and through increased warranty data sharing, including detailed claim data, component interfaces and part interoperability. Technology in the medium term leverages portal capabilities for OEM/Supplier data sharing, establishes a workflow engine with event triggers, and optimizes the use of text mining tools. In the long term the solution provides full integration of business rules between OEM, supplier and dealer to orchestrate business events in an on demand environment. Technology in the long term provides service oriented integration of infrastructure, data management and analytical capabilities. Technology also provides a grid or utility service for a variable infrastructure model.

Similarly, the benefits of the solution grow progressively. In the short term there will be a compression of time to process claims, resulting in fewer incidents for a given problem. In the mid term, warranty reserves will be contained as a percentage of revenue, accuracy of claim data will be improved to facilitate cost recovery with suppliers, and there will be a reduced parts inventory associated with fewer claims. In the long term module and system integration will improve quality management, as compared to analysis of warranty performance on a component by component basis. There will be improved customer satisfaction and brand impact. Further, investment in warranty application management solutions will become a variable rather than a fixed cost.

Figure 13:
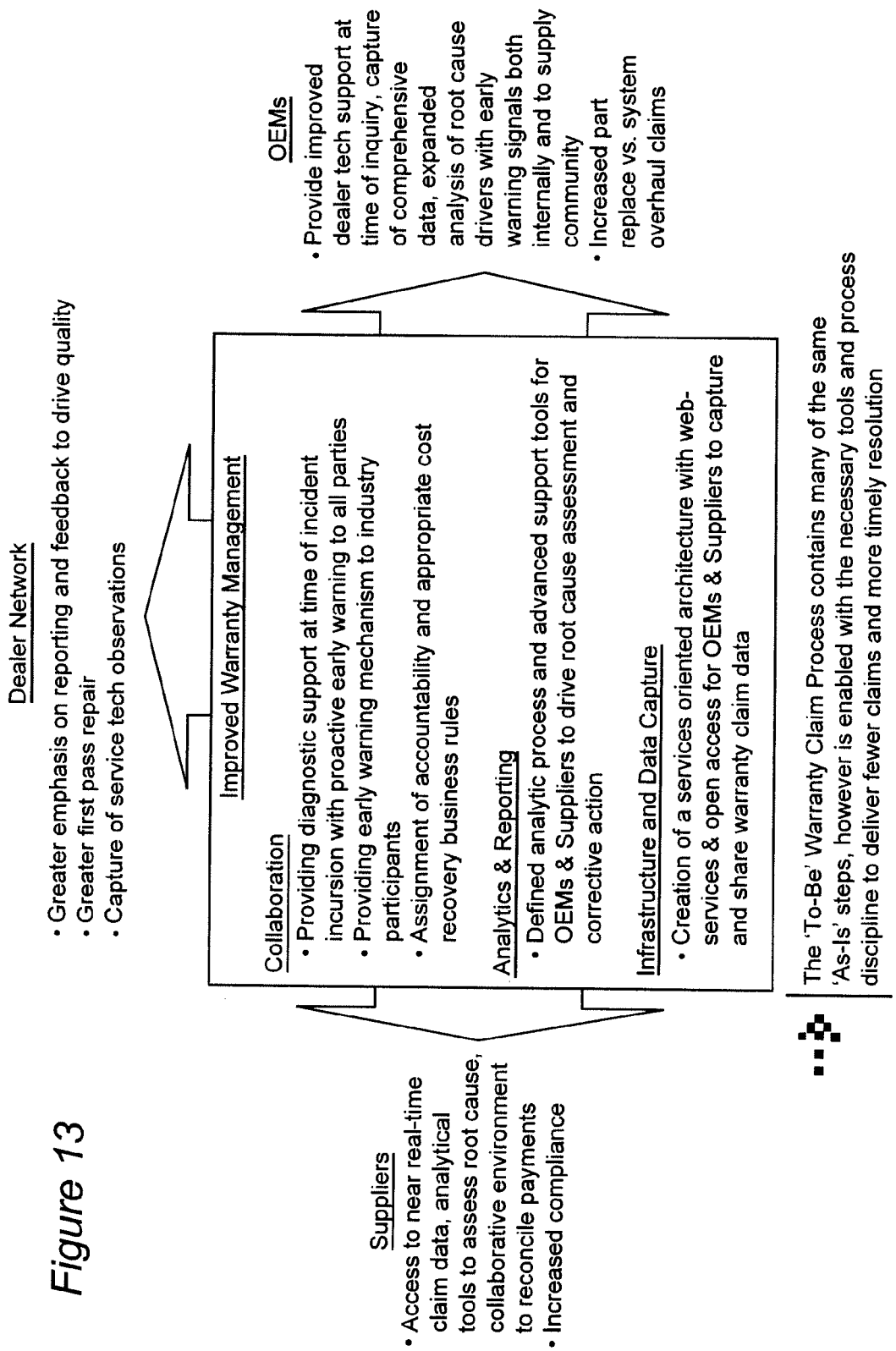
FIG. 13 is a schematic diagram showing the benefits of warranty process enhancements to the various participants in the automotive industry.

Enhancements to warranty claims administration technologies will spread benefits to all participants, as shown in the table of FIG. 13. This chart is an illustrative example of how solutions generated by the invention can be implemented within specific timeframes, their benefits and the technology evolution involved. For warranty claims administration, improved management takes the form of better collaboration (providing diagnostic support at the time the incident is incurred, providing a mechanism for early warning to industry participants, and providing business rules for the assignment of accountability and appropriate cost recovery. Analytics and reporting also improve, with a defined analytic process and advanced support tools for OEMs and suppliers to drive root cause assessment and corrective action. Improvements are also seen in infrastructure and data capture through creation of a services oriented architecture with web services and open access for OEMs and suppliers to capture and share warranty claim data.

For OEMs, these improvements provide improved dealer support at time of initial inquiry about an incident, capture of comprehensive data, and expanded analysis of root cause drivers with early warning signals both internally and to the supply community. To an increasing extent, response to claims will be to replace parts rather than overhaul systems containing the parts. The dealer network benefits from a greater emphasis on reporting and feedback to drive quality, more repairs on the first pass, and capture of the observations of service technicians. Suppliers also benefit from access to near real-time claim data, analytical tools to assess root causes, a collaborative environment to reconcile payments, and increased compliance with government reporting requirements.

Figure 14:
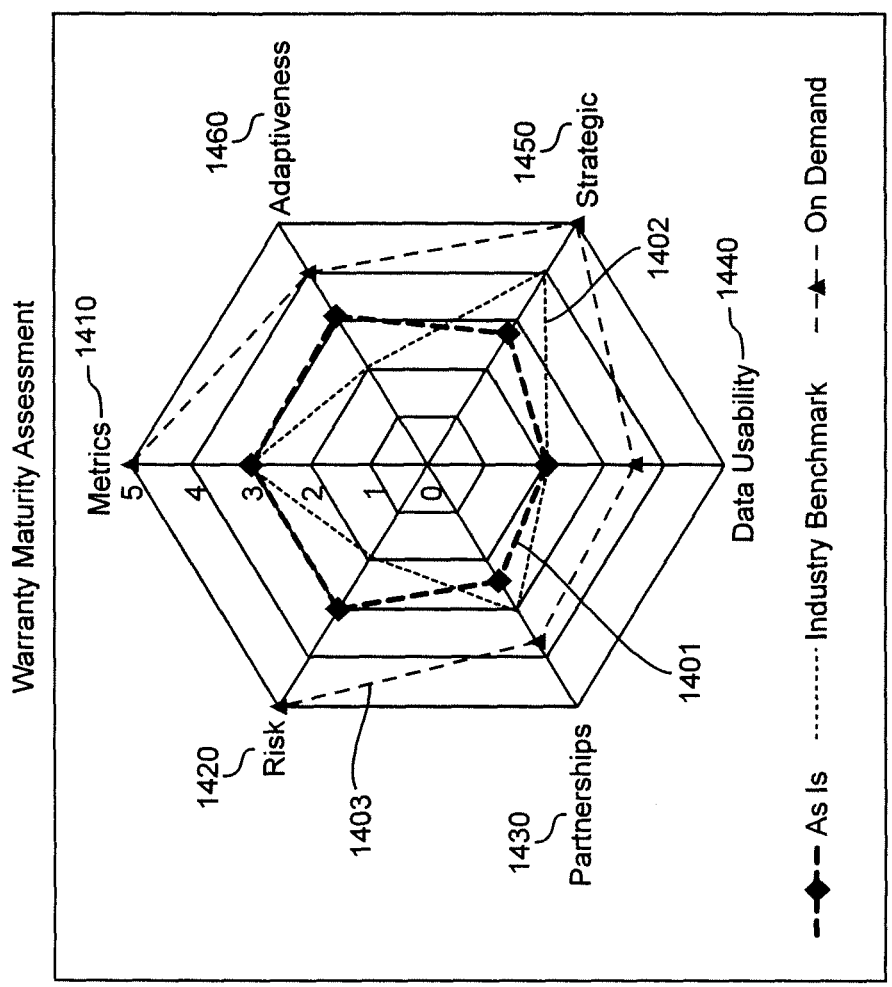
FIG. 14 is a graphical representation of an assessment metric comparing the current state of data usability for warranty purposes with an industry benchmark and a future target state of On Demand computing.

FIG. 14 shows a graphical representation for measuring the impact of the invention on six evaluation axes: metrics (i.e. how well is warranty performance measured) 1410, risk (i.e. how effectively warranty risks are distributed with strategic partners) 1420, partnerships (i.e. the extent to which best in class capabilities are accessed and efficiencies leveraged through connections with partners) 1430, data usability (i.e. the extent to which the process for conversion of enterprise and partner data to useful information is automated and immediate) 1440, strategic (i.e. the percentage of time and cost spent on strategic activities versus reporting and transaction processing) 1450, and adaptiveness (i.e. the extent to which the warranty process and structure is adaptive to changing business needs) 1460. If these evaluation criteria are measured on a scale from 1 to 5, connecting the dots forms a hexagon. FIG. 14 shows three such hexagons, one for an "as-is" condition of a business 1401, one for an industry benchmark 1402, and one for an on demand business following implementation of the invention.

While the invention has been described in terms of a single preferred embodiment, those skilled in the art will recognize that the invention can be practiced with modification within the spirit and scope of the appended claims.

The invention claimed is:

1. A method for using a Component Business Model (CBM) to transform a business process, comprising:
    partitioning business assets into necessarily non-overlapping parts in a structure visually represented as a component map of the Component Business Model (CBM), said partitioning taking the assets of the business and producing therefrom separate components that are mutually exclusive and collectively complete, each said respective component including respective mechanisms for doing something commercially useful with said respective assets;
    defining key performance indicators for the business process;
    mapping the business process to the component map, each step in the process being performed by a performing component and each link between steps being represented on the map by a link between an output of one performing component and an input to another performing component, wherein the mapped display is presented in a plurality of views, each view highlighting a contribution of each of the performing components to an aspect of the business;
    using said multiple views of the mapped display to identify component sources of adverse affects upon the key performance indicators for the business process;
    using the identified sources of adverse affects to identify component business changes for improving the key performance indicators;
    establishing priorities for the identified changes with respect to impact on the key performance indicators;
    defining an information technology architecture to support the identified changes; and
    specifying a roadmap for implementing the supporting information technology architecture in accordance with the priorities established for the identified changes.

2. The method of claim 1, wherein defining an information technology architecture to support the business changes further comprises:
    defining a baseline solution architecture view;
    using the component business model to identify information technology shortfalls;
    mapping the identified sources of adverse affects to the baseline solution architecture view;
    identifying business requirements for eliminating the identified sources of adverse affects;
    identifying information technology capabilities required to support elimination of the identified sources of adverse affects; and
    defining a target solution architecture view using the identified business requirements and the required supporting information technology capabilities.

3. The method of claim 1, wherein using a component business model to prioritize components of the business further comprises:
    developing a view of the component business model that indicates whether a given component is strategic, or is to be operated at competitive parity, or is to be operated at a basic level; and
    developing a view of the component business model that shows an impact of a given component on the key performance indicators.

4. The method of claim 1, wherein the components are comprised of activities and the identified opportunities are opportunities to make business changes in the activities.

5. The method of claim 1, wherein the business process involves collaboration with dealers and suppliers.

6. The method of claim 1, wherein the business is the automobile manufacturing business, the business process is the warranty claims process, and a length of time to process a warranty claim is a key performance indicator.

7. A computer implemented system for using a component business model to transform a business process, comprising:
    a structure visually represented as a component map of a Component Business Model (CBM), the components being partitioned from business assets into necessarily non-overlapping parts, said partitioning taking the assets of the business and producing therefrom separate components that are mutually exclusive and collectively complete, each said respective component including respective mechanisms for doing something commercially useful with said respective assets;
    key performance indicators for the business process;
    a mapped overlay of the business process upon the component map, each step in the process being performed by a performing component and each link between steps being represented on the map by a link between an output of one performing component and an input to another performing component, wherein the mapped display is presented in a plurality of views, each view highlighting a contribution of each of the performing components to an aspect of the business;

means implemented by the computer for using said plurality of views of the mapped overlay to identify component sources of adverse affects upon the key performance indicators for the business process;

means implemented by the computer for using the identified sources of adverse affects to identify component business changes for improving the key performance indicators;

means implemented by the computer for establishing priorities for the identified changes with respect to impact on the key performance indicators;

means implemented by the computer for defining an information technology architecture to support the identified changes; and means implemented by the computer for specifying a roadmap for implementing the supporting information technology architecture in accordance with the priorities established for the identified changes.

8. The system of claim 7, wherein the means for defining an information technology architecture to support the business changes further comprises:

means for defining a baseline solution architecture view;

means for using the component business model to identify information technology shortfalls;

means for mapping the identified sources of adverse affects to the baseline solution architecture view;

means for identifying business requirements for eliminating the identified sources of adverse affects;

means for identifying information technology capabilities required to support elimination of the identified sources of adverse affects; and means for defining a target solution architecture view using the identified business requirements and the required supporting information technology capabilities.

9. The system of claim 7, wherein the means for using a component business model to prioritize components of the business further comprises:

means for developing a view of the component business model that indicates whether a given component is strategic, or is to be operated at competitive parity, or is to be operated at a basic level; and means for developing a view of the component business model that shows an impact of a given component on the key performance indicators.

10. The system of claim 7, wherein the components are comprised of activities and the identified opportunities are opportunities to make business changes in the activities.

11. The system of claim 7, wherein the business process involves collaboration with dealers and suppliers.

12. The system of claim 7, wherein the business is the automobile manufacturing business, the business process is the warranty claims process, and a length of time to process a warranty claim is a key performance indicator.

13. Implementing a service for using a component business model to transform a business process, comprising the method of:

partitioning business assets into necessarily non-overlapping parts in a structure visually represented as a component map of the Component Business Model (CBM), said partitioning taking the assets of the business and producing therefrom separate components that are mutually exclusive and collectively complete, each said respective component including respective mechanisms for doing something commercially useful with said respective assets;

defining key performance indicators for the business process;

mapping the business process to the component map, each step in the process being performed by a performing component and each link between steps being represented on the map by a link between an output of one performing component and an input to another performing component, wherein the mapped display is presented in a plurality of views, each view highlighting a contribution of each of the performing components to an aspect of the business;

using said plurality of views of the mapped display to identify component sources of adverse affects upon the key performance indicators for the business process;

using the identified sources of adverse affects to identify component business changes for improving the key performance indicators;

establishing priorities for the identified changes with respect to impact on the key performance indicators;

defining an information technology architecture to support the identified changes; and specifying a roadmap for implementing the supporting information technology architecture in accordance with the priorities established for the identified changes.

14. A method implementing a service as in claim 13, wherein defining an information technology architecture to support the business changes further comprises:

defining a baseline solution architecture view;

using the component business model to identify information technology shortfalls;

mapping the identified sources of adverse affects to the baseline solution architecture view;

identifying business requirements for eliminating the identified sources of adverse affects;

identifying information technology capabilities required to support elimination of the identified sources of adverse affects; and defining a target solution architecture view using the identified business requirements and the required supporting information technology capabilities.

15. A method implementing a service as in claim 13, wherein using a component business model to prioritize components of the business further comprises:

developing a view of the component business model that indicates whether a given component is strategic, or is to be operated at competitive parity, or is to be operated at a basic level; and developing a view of the component business model that shows an impact of a given component on the key performance indicators.

16. A method implementing a service as in claim 13, wherein the components are comprised of activities and the identified opportunities are opportunities to make business changes in the activities.

17. A computer implemented system for using a component business model to transform a business process, comprising:

a computer processor capable of executing computer code implemented on the computer;

first computer code implemented on the computer for partitioning business assets into necessarily non-overlapping parts in a structure visually represented as a component map of a Component Business Model (CBM), said partitioning taking the assets of the business and producing therefrom separate components that are mutually exclusive and collectively complete, each said respective component including respective mechanisms for doing something commercially useful with said respective assets;

second computer code implemented on the computer for defining key performance indicators for the business process;

third computer code implemented on the computer for mapping the business process to the component map, each step in the process being performed by a performing component and each link between steps being represented on the map by a link between an output of one performing component and an input to another performing component, wherein the mapped display is presented in a plurality of views, each view highlighting a contribution of each of the performing components to an aspect of the business;

fourth computer code implemented on the computer for using said plurality of views of the mapped display to identify component sources of adverse affects upon the key performance indicators for the business process;

fifth computer code implemented on the computer for using the identified sources of adverse affects to identify component business changes for improving the key performance indicators;

sixth computer code implemented on the computer for establishing priorities for the identified changes with respect to impact on the key performance indicators;

seventh computer code implemented on the computer for defining an information technology architecture to support the identified changes; and eighth computer code implemented on the computer for specifying a roadmap for implementing the supporting information technology architecture in accordance with the priorities established for the identified changes.

* * * * *